United States Patent
Sarkkinen et al.

(10) Patent No.: US 8,549,287 B2
(45) Date of Patent: *Oct. 1, 2013

(54) CIPHERING AS A PART OF THE MULTICAST CONCEPT

(75) Inventors: Sinikka Sarkkinen, Kangasala (FI); Kimmo Kettunen, Espoo (FI); Niina Karhuluoma, Hämeenkyrö (FI); Antti-Pentti Vainio, Espoo (FI); Valtteri Niemi, Helsinki (FI); Jan Kall, Espoo (FI)

(73) Assignee: Nokia Corporation, Espoo (FI)

( * ) Notice: Subject to any disclaimer, the term of this patent is extended or adjusted under 35 U.S.C. 154(b) by 1329 days.

This patent is subject to a terminal disclaimer.

(21) Appl. No.: 10/493,209

(22) PCT Filed: Aug. 14, 2002

(86) PCT No.: PCT/IB02/03242
§ 371 (c)(1),
(2), (4) Date: Apr. 21, 2004

(87) PCT Pub. No.: WO03/036908
PCT Pub. Date: May 1, 2003

(65) Prior Publication Data
US 2005/0015583 A1 Jan. 20, 2005

(30) Foreign Application Priority Data

Oct. 24, 2001 (WO) ........................ PCT/EP01/12301
Jun. 28, 2002 (WO) ........................ PCT/IB02/02497

(51) Int. Cl.
*H04L 29/06* (2006.01)

(52) U.S. Cl.
USPC ........... 713/163; 713/150; 713/168; 713/170; 713/179

(58) Field of Classification Search
USPC .......................... 713/150, 163, 168, 170, 179
See application file for complete search history.

(56) References Cited

U.S. PATENT DOCUMENTS

| 4,531,020 A | * | 7/1985 | Wechselberger et al. ...... 380/239 |
| 5,077,790 A | * | 12/1991 | D'Amico et al. ............. 380/249 |

(Continued)

FOREIGN PATENT DOCUMENTS

| EP | 0 944 275 A2 | 9/1999 |
| EP | 1 119 132 A2 | 7/2001 |

(Continued)

OTHER PUBLICATIONS

ETSI: "Universal Mobile Telecommunications System (UMTS); 3G Security; Security Architecture (3GPP TS 33.102 version 4.2.0 Release 4)" ETSI Technical Specification, Sep. 2001, XP002222659 retrieved from the Internet: URL:www.etsi.org, retrieved on Nov. 28, 2002.

(Continued)

*Primary Examiner* — Chau Le
(74) *Attorney, Agent, or Firm* — Mintz, Levin, Cohn, Ferris, Glovsky & Popeo, P.C.

(57) ABSTRACT

The invention proposes a method for transmitting a message to a plurality of user entities in a network by using a multicast service, comprising the steps of encrypting a multicast message by using ciphering, and sending the encrypted multicast message to the plurality of user entities simultaneously. The invention also proposes a corresponding multicast service control device and a corresponding user entity.

55 Claims, 7 Drawing Sheets

(56) References Cited

U.S. PATENT DOCUMENTS

| | | | |
|---|---|---|---|
| 5,117,458 A * | 5/1992 | Takaragi et al. | 380/228 |
| 5,218,638 A * | 6/1993 | Matsumoto et al. | 380/228 |
| 5,537,474 A * | 7/1996 | Brown et al. | 380/248 |
| 5,642,418 A * | 6/1997 | Farris et al. | 380/211 |
| 5,748,736 A | 5/1998 | Mittra | |
| 5,751,813 A | 5/1998 | Dorenbos | |
| 5,966,449 A * | 10/1999 | Iwamura et al. | 380/44 |
| 5,987,137 A * | 11/1999 | Karppanen et al. | 380/28 |
| 6,026,165 A * | 2/2000 | Marino et al. | 380/273 |
| 6,144,673 A * | 11/2000 | Korus | 370/432 |
| 6,148,405 A * | 11/2000 | Liao et al. | 726/2 |
| 6,195,751 B1 | 2/2001 | Caronni et al. | |
| 6,223,286 B1 * | 4/2001 | Hashimoto | 713/178 |
| 6,223,291 B1 * | 4/2001 | Puhl et al. | 726/28 |
| 6,393,128 B1 * | 5/2002 | Rix et al. | 380/283 |
| 6,496,928 B1 * | 12/2002 | Deo et al. | 713/153 |
| 6,529,487 B1 * | 3/2003 | Rose | 370/328 |
| 6,681,114 B2 * | 1/2004 | Chang et al. | 455/456.3 |
| 6,714,649 B1 * | 3/2004 | Masuda et al. | 380/44 |
| 6,799,272 B1 * | 9/2004 | Urata | 713/171 |
| 7,055,030 B2 * | 5/2006 | Negawa | 713/163 |
| 7,072,865 B2 * | 7/2006 | Akiyama | 705/51 |
| 7,076,654 B2 * | 7/2006 | Kawamoto | 713/163 |
| 7,131,006 B1 * | 10/2006 | Carroll | 713/171 |
| 2002/0172366 A1 * | 11/2002 | Peterka et al. | 380/277 |
| 2003/0043786 A1 | 3/2003 | Kall et al. | |
| 2003/0070092 A1 * | 4/2003 | Hawkes et al. | 713/201 |
| 2006/0025125 A1 * | 2/2006 | Hong et al. | 455/422.1 |

FOREIGN PATENT DOCUMENTS

| | | |
|---|---|---|
| WO | WO 99/16277 | 4/1999 |
| WO | WO 01/17288 A1 | 3/2001 |
| WO | WO 01/45317 A2 | 6/2001 |

OTHER PUBLICATIONS

Blom et al, "<draft-ietf-avt-srtp-01.txt>—The Secure Real Time Transport Protocol", Internet Draft, Jul. 2001, XP000222266, retrieved from the Internet: URL:http://www.globecom.nethetf/draft/draft-ietf-avt-srtn-01.html; retrieved on Nov. 27, 2002.

Arkko et al, "MIKEY: Multimedia Internet Keying" <draft-ietf-msec-mikey-00.txt>, Internet Engineering Task Force, MSEC Working Group, Nov. 2001, pp. 1-37.

Hardjono et al, "Group Security Policy Token", <draft-ietf-msec-gspt-01.txt>, Internet Research Task Force, Internet-Draft, Nov. 14, 2001, pp. 1-24.

Harney et al, "Group Secure Association Key Management Protocol", <draft-ietf-msec-gsakmp-sec-00.txt>,, Internet-Draft, Sparta, Inc., National Security Agency, Mar. 2001, pp. 1-50.

Harney et al, "GSAKMP Light", draft-ietf-msec-gsakmp-light-sec-00.txt, Internet-Draft, Sparta, Inc., Sep. 2001, pp. 1-37.

Baugher et al, "Group Key Management Architecture", <draft-ietf-msec-gkmarch-01.txt>, Internet Engineering Task Force, Internet Draft, Oct. 23, 2001, pp. 1-20.

Baugher et al, "The Group Domain of Interpretation", <draft-ietf-msec-gdoi-03.txt>, Internet Engineering Task Force, Internet Draft, Jan. 16, 2002, pp. 1-30.

ETSI TS 133 102 V3.9.0 (Jun. 2001), Universal Mobile Telecommunications System (UMTS); 3G Security; Security Architecture (3GPP TS 33.102 version 3.9.0 Release 1999).

Harney, H. "*Group Secure Association Key Management Protocol*", Sparta, Inc., The Internet Society, Jun. 2000, pp. 1-49.

Canetti, Ran et al., "*Multicast Data Security Transformations: Requirements, Considerations, and Proposed Design*", Internet Research Task Force, Jun. 2000, pp. 1-13.

Hardjono, Thomas et al., "*Secure IP Multicast: Problem areas, Framework, and Building Blocks*", Internet Research Task Force, Sep. 2000, pp. 1-21.

Harney, Hugh et al., "*GKM Building Block: Group Security Association (GSA) Definition*", Internet Research Task Force, Sep. 2000, pp. 1-18.

McDaniel, Patrick et al., "*Multicast Security Policy*", Internet Research Task Force, Nov. 2000, pp. 1-15.

Canetti, R., et al., "*A Taxonomy of Multicast Security Issues*", Internet Draft, Aug. 2000, pp. 1-20.

Perrig, et al., "*TELSA: Multicast Source Authentication Transform*", Internet Engineering Task Force, Jun. 17, 2001, pp. 1-32.

3GPP TS 22.146 v5.2.0, $3^{rd}$ Generation Partnership Project; *Technical Specification Group Services and System Aspects; Multimedia Broadcast/multicast Service; Stage 1* (Release 5), Mar. 2002, pp. 1-14.

"*Multicast Security (msec)*", Internet website, (msec-charter.pdf), Mar. 26, 2002, pp. 1-3.

* cited by examiner

CIPHERING AS A PART OF THE MULTICAST CONCEPT

FIELD OF THE INVENTION

The present invention relates a method for transmitting a message to a plurality of subscribers.

BACKGROUND OF THE INVENTION

The reception of traffic in point to multipoint (PTM) communication is typically organized in the following way:

A potential receiver must become a member of a receiver group (join the group) and whenever he wants to quit the reception he must leave the group. During the group membership the PTM data reception is possible. Parties not being members do not receive this data. Joining and leaving can be done whenever wanted. This kind of communication model is called multicasting. A special case of multicasting is broadcasting in which the data is delivered to all potential receivers.

When multicast communication model is applied to a mobile environment, limiting the data reception only to joined members might become a problem since the data is delivered over a radio link thus making eavesdropping possible to non-group members. With encryption this problem can be solved by enabling only authorized parties (i.e. receivers that have joined the group) to decrypt the delivered encrypted data. The decryption is made possible by giving the decryption key only to the group members.

The work to standardise the Multicast as a new service has been started in 3GPP (Third Generation Partnership Project). The aim in this work is to enhance the current capabilities in UTRAN (UMTS terrestrial radio access network) (and maybe later also in CN (core network)) the way that it is also capable of providing such services, which are using the common network resources, but which are intended only to a restricted group of people in a cell. These requirements are not fulfilled in current Cell Broadcast concept, which is already standardised in 3GPP release 99.

Basically the standardisation of the multicast type of service means that the new service concept should be capable of transmitting data simultaneously to a group of people, who previously indicated their interest to receive data from a Multicast service. As part of their indication they also accepted that the service provider is allowed to charge subscribers for the service (the charging can be based on e.g. monthly fee, the usage time of the multicast service or the amount of received data).

It is noted that the service provider can be either the external service provider (e.g. a person, community, state, government, company) who does not own the network or operator itself, who owns the network through which multicast data is transmitted.

In one cell the multicast related data is sent at the same time to all subscribers by using a single communication path on the radio interface. In UTRAN this communication path can consist of e.g. SCCPCH (Secondary control Channel, a physical channel), which is currently used to transmit data from common channels and the FACH (Forward Link Access Channel, a transport channel), which is devoted for the cell broadcast services. The main requirement for the used channel is that this channel can/is allowed to listen more than one UE (User Equipment) and it is capable of transmitting also streaming type of data.

A cell broadcast service is a service type, which is already part of the 3GPP release 99. Cell broadcast service uses as a transport channel Forward Access Channel (FACH) and on the air interface secondary common physical channel (SC-CPCH). The cell broadcast service is characterised by such services, which are not secured or charged from end users by the service provider (or operators) and each UE in the cell—even if they are in Idle mode—are allowed to listen the data from the air interface, which is belonging to the cell broadcast service. A typical cell broadcast service could be e.g. small advertisements, road information etc.

In order to use such a commonly known channel on the air interface and at the same time to provide e.g. charging, in the multicast scheme it should be possible for the service providers (or the network) to allow only the authorised subscribers to access the multicast service. This means that it shall be possible to exclude all unauthorised users from the service even if the UE (User Entity) is capable of listening to the physical channel. For multicast services it has been proposed to use ciphering for this purpose.

Ciphering of multicast services is not a similar concept as the ciphering that is used for e.g. dedicated channels. When the used transport channel is a dedicated transport channel (or a common channel for DCCH (Dedicated control Channel) or DTCH (Dedicated Traffic Channel) (DCCH and DTCH are both logical channels)), the used security information is sent to the UE upon establishment of the radio bearer (RB). For that purpose, for the UE, the NW (Network) has before the actual data transmission (and also upon that) setup separate signalling connections for the transmission of L3 signalling messages. It is noted that L3 stands for Layer 3 (in UTRAN=RRC (Radio Resource Control)), a protocol layer.

The multicast services were not supported by 3GPP rel.99 or rel.4, and therefore no security procedures for point-to-multipoint services have been defined. Also it is not possible to separate between unauthorised and authorised users from service point of view on such channels, which are commonly used for multiple UEs.

It is noted that the sharing of the common channels between multiple UEs is possible due to use of UE specific identification in the data message. This method however is not feasible as such in this case because data is meant to a group of UEs and the use of "group id" instead of UE specific id does not prevent unauthorised UEs to fetching data from the shared common channel.

SUMMARY OF THE INVENTION

Thus, the object underlying the invention resides in allowing network to provide secured multicast services (i.e. point-to-multipoint services).

This object is solved by a method for transmitting a message to a plurality of user entities in a network by using a multicast service, comprising the steps of
encrypting a multicast message by using ciphering, and
sending the encrypted multicast message to the plurality of user entities.

Thus, a multicast message is encrypted. That is, the message can be sent via a common channel over the network, and only those subscribers which are allowed to receive this message may decrypt it.

Therefore, the reception of a multicast message, i.e., point-to-multipoint data is restricted on a specific group of subscribers. Moreover, by encrypting the message, also different multicast sessions can be established in one cell. That is, different multicast services can be offered in the same cell in the same time.

The invention also proposes a multicast service control device for transmitting a message to a plurality of user entities in a network, by using a multicast service wherein the device is adapted to encrypt a multicast message by using ciphering, and to send the encrypted multicast message to the plurality of user entities.

Moreover, the invention proposes a user entity in a network which is adapted to receive an encrypted multicast message transmitted to a plurality of user entities in a network by using a multicast service, and to decrypt the encrypted multicast message by using deciphering.

Furthermore, the invention also proposes a network comprising a multicast service control device described above and at least one user entity described above.

Further advantageous developments are set out in the dependent claims.

In particular, the encrypted multicast message may be decrypted in each user entity individually.

The ciphering may be performed by using a ciphering key, wherein the ciphering key may be the same for encrypting and decrypting, or a first ciphering key may be used for encrypting whereas a second ciphering key different from the first ciphering key may be used for decrypting.

The ciphering key may be changed in a defined time frame. In this way, security can be improved since the ciphering key is changed regularly.

Ciphering key generation related input parameters may be sent to the user entity when the user entity registers with a service sending encrypted messages to a plurality of user entities. Alternatively, ciphering key generation related input parameters may be sent to the user entity when a transmission of encrypted messages to a plurality of user entities is activated. Thus, ciphering key generation related input parameters can be sent to the user entity by using normal control signalling.

It is noted that not all ciphering key generation related input parameters are sent during one occasion. That is, some parameters may be sent during registration/subscription of the subscriber, and other parameters may be sent on joining/activation of the transmission.

Thus, the actual ciphering key is not sent over the air interface. Instead, basically such ciphering related parameters based on which UE is capable of calculating correct deciphering key are sent.

By sending those parameters, and not the actual ciphering key, security is improved.

The ciphering key may be stored in a memory of the user entity, or it may be stored in a subscriber identification module (SIM). The ciphering key should not be accessible for the user of the user entity. In this way, the security can be improved.

Moreover to improve security against, e.g., a hacker, at least one input parameter may be used for encrypting. Such an input parameter may comprise at least one subscriber related value. Thus, it is ensured that only the subscriber to which the value relates is able to decrypt the message.

The subscriber related value may comprise a group identification for identifying a whole group of subscribers which are allowed to receive the message. In this way, the operation load for assigning a subscriber value to each subscriber individually can be reduced.

The input parameter may comprise at least one service related value. Thus, in this way the multicast message can only be decrypted in case the user entity knows this service related value. Hence, it can be ensured that only those user entities may decrypt the multicast message which have subscribed to the service.

Such a service related value may comprise a service identification for identifying a service type. The service type denotes a group of services. Moreover, the service related value may comprise a subservice identification for identifying a particular service.

The input parameter mentioned above may also comprise at least one network related value for identifying a particular network. Furthermore, the input parameter may comprise at least one cell related value for identifying a particular cell.

The input parameter may also be described in the identification of the multicast data frame (i.e. upon active data transmission). This identification can be e.g. sequence number, timestamp etc. With the aid of the packet related identification the security of the transmission can be improved, because the used encryption changes frame by frame.

For decrypting, the input parameter used for encrypting may be used. That is, the same input parameter which was used for encrypting is also used for decrypting.

The input parameter may be stored in a memory of the user entity, or/and it may be stored in a subscriber identification module (SIM).

The input parameter should not be accessible for the user of the user entity. In this way, the security can be improved, since the user can not access the security parameters.

Some or all of the required input parameters may be sent to the user entity upon registering (or subscribing) to a service.

Some or all of the required parameters for deciphering may be sent to the user entity as a control information of the actual multicast data packets (i.e., e.g., inside the header of the Multicast data frame or as an independent control frame).

The receiving of multicast related data may trigger the start of the decryption. Alternatively, the start of the decryption may be triggered by the network, by sending pre-information of a multicast message to be sent. Furthermore, the start of the decryption may be triggered by the subscriber. Thus, three different ways about how the decryption is actually started are proposed. The trigger may be a pin code or a password.

For encryption an encryption algorithm may be used which uses at least a counter value as an input parameter, which is delivered to the plurality of user entities. That is, by delivering the counter value to the user entities, the same kind of encryption algorithm as in, e.g., UMTS may be used. In this way, the method according to the invention can easily be applied to existing schemes. The encryption algorithm may be the f8 encryption algorithm.

The counter value may be delivered to the plurality of users unencrypted together with encrypted data. Thus, it is not necessary to provide additional signalling since the counter value is transmitted together with the user data, i.e., the encrypted data packets. That is, the counter value is delivered in conjunction with the content stream (in plain text via PTM channel), thus enabling the receivers to decrypt the content.

Moreover, a session key may be calculated from a shared key and a random number, the session key being used as a further input parameter of the encryption algorithm, and the random number may be updated and sent to the plurality of user entities at certain times. Thus, the security can be improved since the random number is changed at certain times.

The random number may be updated at regular time intervals. Thus, the decryption key can be updated periodically. With this approach, no additional point to point signalling between the network and the terminal is required and thus network resources are saved.

Furthermore, the random number may be delivered unencrypted to the plurality of users. Thus, the procedure can be simplified since no extra encryption/decryption of the random number is necessary.

The shared key may be delivered to the plurality of users via a secure channel using a point-to-point connection. Thus, the security can be improved, since the shared key is not sent via multicast.

A bearer identifier may be used as a further input parameter for the encryption algorithm, and the bearer identifier may be delivered to the plurality of users via a secure channel.

The multicast message may be sent via a single physical channel.

Moreover, ciphering information, which are used for ciphering may be sent to the user entity in two phases. Namely, a first part of the ciphering information may be sent to the user entity when the user entity registers/subscribes with a multicast service, and a second part of the ciphering information may be sent to the user entity when a multicast transmission of encrypted multicast messages is activated.

By this method, security can be improved further since all necessary ciphering information (security parameters etc.) are not transmitted via one message only. Hence, an eavesdropping user entity may catch one part of the ciphering information, but cannot use it since it does not have the other part.

The above-mentioned activation of the multicast transmission can be performed by e.g. by MBMS (Multicast Broadcast Multimedia Service) joining, for example.

The first part of the ciphering information may be sent in a service registration/subscription response message in a point-to-point connection. The second part of the ciphering information may be sent in a joining response message by using a channel which is available at least to all multicast/broadcast capable user entities. This channel can be e.g. so called common channel or enhanced common channel.

That is, by this method the access to a service can be split in two phases. Namely, in a first phase, basic service registration/subscription is performed, and in a second phase, an actual joining of the subscribed service is performed. Only those subscribers performing both phases are able to decipher the multicast service.

If, on the other hand, all ciphering information (encryption parameters) were sent upon service registration/subscription phase to the user entity, the user entity would not have to perform the joining procedure to be able to decipher the received MBMS session. This means in practise that the service provider/operator does not know which user entitys are listening and which are not.

In addition, separation of the security information (needed for calculation of the ciphering key) delivery into at least two different phases allows the transmission of joining messages (joining request messages and/or joining response messages) without any point-to-point connection, which saves resources at the radio access network.

Furthermore, service information may be sent only with the first part of the ciphering information and not with the second part of the ciphering information. Thus, an eavesdropping user entity can not use a message including the second part of the ciphering information, since this user entity does not know for which service the received information is meant.

Ciphering may be performed by using a ciphering key, and the ciphering information may comprise one or more ciphering key generation related parameters. The first part of the ciphering information may comprise a first part of the ciphering key generation related parameter, and the second part of the ciphering information may comprise a second part of the ciphering key generation related parameters. That is, the ciphering key generation related parameters are split up in two parts. Hence, an eavesdropping user entity cannot generate the ciphering key when receiving only the second part of the ciphering information.

The first part of the ciphering key generation related parameter may comprise the most significant bits from the ciphering key generation related parameters, and the second part of the ciphering key generation related parameters may comprise the least significant bits from the ciphering key generation related parameters. Alternatively, the first part of the ciphering key generation related parameters may comprise the least significant bits from the ciphering key generation related parameter, and the second part of the ciphering key generation related parameters may comprise the most significant bits from the key generation related parameters.

Furthermore, the ciphering key generation related parameter may be sent with one of the first or the second part of the ciphering information, and the other part of the ciphering information may comprise an indication how the ciphering key generation related parameter is to be used for calculating a ciphering key, e.g. indication how security algorithm should be used.

Moreover, the second part of the ciphering information may be ciphered by using a subscriber identity related parameter, e.g., IMSI (International Mobile Subscriber Identity). In this way, security can be further enhanced.

Furthermore, for ciphering, ciphering information may be used, and the ciphering information may be sent from the user entity to a multicast service control device, and the ciphering information may be used for authenticating the user entity by the multicast service control device. Thus, the ciphering information (which may comprise a ciphering key) can also be used as an authentication parameter. This eliminates the necessity to generate additional authentication information.

The ciphering information may contain a service identification identifying the requested service. Also, the ciphering information may contain a service indication, which is a value allocated to a service identification identifying the requested service. In this way, an additional value is used which indicates the requested service on the one hand, but which is not directly available to a non-registered user entity.

The allocation between the service identification and the service indication may changed dynamically. Thus, the value changes with time such that security can be further enhanced.

The allocation between the service identification and the service indication may be determined using a map.

Moreover, the ciphering can be performed using a ciphering key, and a ciphering key is calculated based on the service indication and a user identification value, and the authentication of the user entity is performed using this ciphering key. The user identification value may be the International Mobile Subscriber Identification (IMSI).

Moreover, the ciphering information may be sent to the multicast service control device in a message by using a channel not requiring a Radio Resource Controller (RRC) connection. This saves network resources.

In addition, the invention also proposes148 a method for authenticating a user entity, comprising the steps of
generating an authentication key based on at least one authentication parameter in the user entity,
sending a message including the authentication key in a message from the user entity to the network control device, and
authenticating the user entity by using the received authentication key in the network control device.

That is, the authentication key, which may be a ciphering key as described above, is used for authenticating a user entity. The authentication key may also be used for ciphering, but it may be used for authentication only.

The authentication parameter may comprise a user identification value, which may be the International Mobile Subscriber Identification (IMSI).

The authentication parameter may contain a service identification identifying a requested service. The authentication information may contain a service indication, which is a value allocated to a service identification identifying a requested service, as described above with respect to the ciphering key. The allocation between the service identification and the service indication may be changed dynamically. The allocation between the service identification and the service indication may be determined using a map.

Moreover, the message containing the authentication key may be sent to the network control device by using a channel not requiring an RRC connection.

BRIEF DESCRIPTION OF THE DRAWINGS

The present invention will be more readily understood with reference to the accompanying drawings in which.

DETAILED DESCRIPTION OF PREFERRED EMBODIMENTS

In the following, preferred embodiments of the invention is described in more detail with reference to the accompanying drawings.

Figure 1:
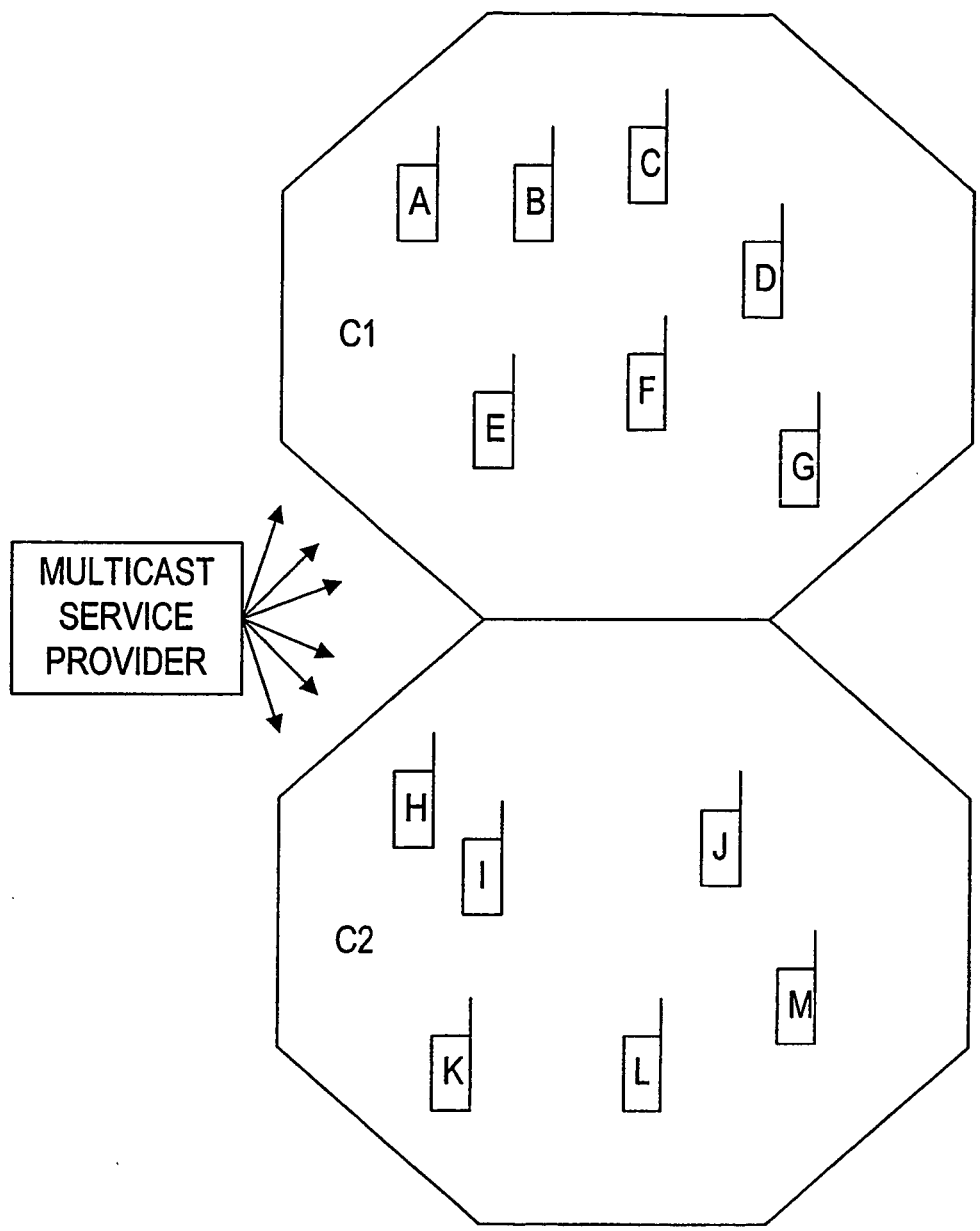
FIG. 1 illustrates two cells of a network in which the embodiments of the invention can be applied.

FIG. 1 illustrates a simplified example, wherein a multicast service provider sends messages to a plurality of UE's (User Entities) A to M by using multicast. UE's A to G are located in a cell C1, whereas UE's H to M are located in a cell C2.

According to the invention, for the multicast transmission the following requirements are seen valid:

Multicast data should be transmitted through one physical channel, the configuration information of which (i.e. Transport Formats, used codecs etc) is common knowledge.

It should be possible to separate authorised and unauthorised users of the cell.

It should be possible to establish several different multicast sessions in a cell (e.g. containing video clips, music, etc.) and the user shall be able to select which multicast session to receive.

It should be possible to make out different multicast sessions, even though they are using the same network resources e.g. on the air interface.

These requirements define that it should be possible for the operator/service provider to control the transmission of the multicast type of data in such a way that only subscribers which have registered with the multicast service are the only ones to get it as well. This is a new service concept which is not provided for in the current cell broadcast service and therefore new procedures are required.

One such procedure is the use of the ciphering for the multicast services. With the aid of ciphering the authorised and unauthorised users can be separated as well as distinction made between different services. However, because the current ciphering is designed for the point-to-point connections, some modifications are required to the current security procedure regarding:

Ciphering key allocation

Input parameters for ciphering algorithms

Management of the ciphering keys.

(Note: The changes could be done also by considering the security concept (i.e. symmetric versus asymmetric ciphering))

Next, the ciphering key allocation according to the first embodiment is described in more detail.

There are a plurality of possibilities when the information, which can be used to define the correct multicast ciphering key (Ck), can be allocated to the subscriber (i.e., the User Entity (UE)).

One possibility is when the subscriber registers with the multicast service (e.g. by WLAN, Internet, phone call, letter, personal visit etc.), based on registration the either the external service provider or operator configures the subscriber's UE to receive subscribed type of multicast services. This can be made e.g. by using config SMS or personally at the operators/service providers premises. A config SMS is an SMS (Short Message Service) type, which can be transparent to the subscriber (or reception of such SMS is agreed by the subscriber e.g. upon time when SMS is received) but which can change the information or configuration of the UE. This SMS is always sent upon RRC connected state and therefore it is ciphered by using the methods which has been defined already in 3GPP rel.99 and rel 4/5.

Another possibility is to give the information to the subscriber (UE) each time before the multicast data transmission is activated, i.e. inside the precontrol information sent to the UE (e.g. in the RRC signalling message). As an alternative the ciphering key related input parameters can also be sent by the Core network (CN) to the UE in the MM/SM (Mobility Management/Session management) level signalling message. MM and SM are functionalities in CN.

Alternatively, the information can be delivered to the UE as the peer to peer signalling connections between layers to support multicast data transmission on UTRAN and UE side. Such a layer does not exist yet, because the 3GPP RAN working groups have not yet made any decision to include such a layer. This layer can be a new layer or it can be e.g. the enhanced BMC layer or MBMC layer (Multicast/Broadcast Multimedia Control layer).

Based on the sent information the UE can generate the correct Ck for the service.

Next, the input parameters for the ciphering algorithms used by a ciphering unit according to the first embodiment are described in more detail.

The ciphering unit is a unit either in CN or UTRAN, which consists of encryption algorithm, which uses specific input parameters to perform required ciphering transaction to the data meant to be encrypted.

In particular, modified input parameters for the ciphering unit are required. The parameters are described by referring to FIGS. 2 and 3.

Figure 2:
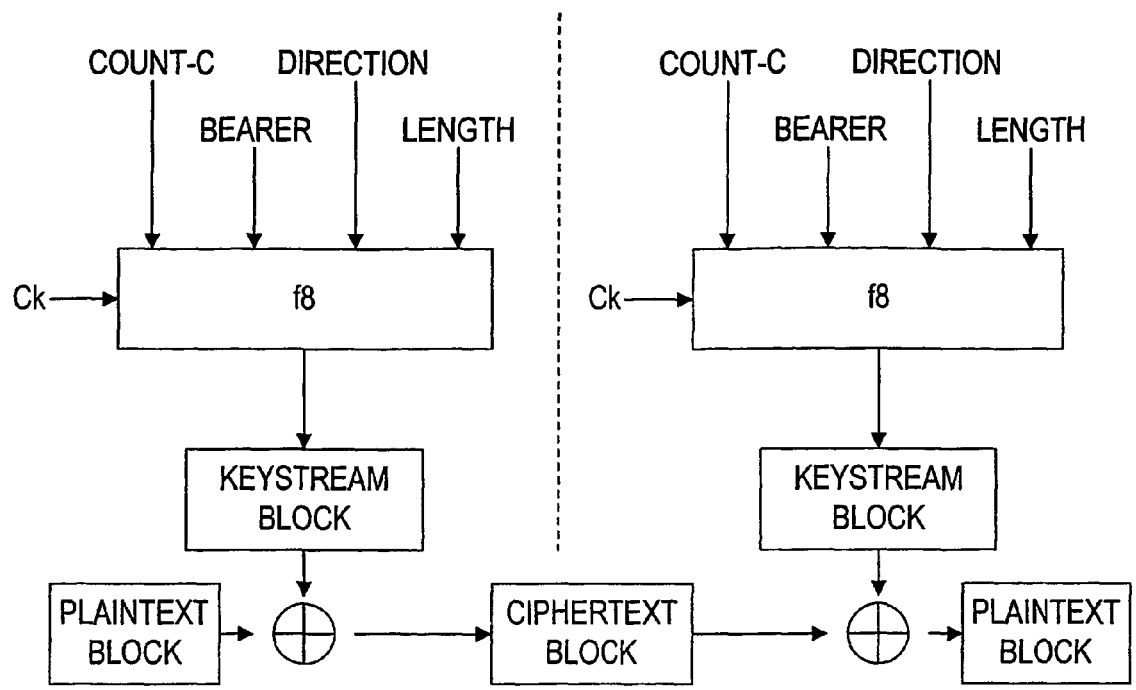
FIG. 2 shows ciphering of user and signalling data transmitted over radio access link for point-to-point services.

FIG. 2 shows ciphering of user and signalling data transmitted over the radio access link for point-to-point services, as defined in TS 33.102.

As shown in FIG. 2, a plaintext is encrypted by applying a keystream using bit per bit binary addition of the plaintext and the keystream. The keystream is generated by using the ciphering algorithm f8, which uses a ciperhing key Ck and various input parameters COUNT-C, BEARER, DIRECTION, LENGTH etc.

To support encryption for such services as the multicast services the currently used set of input parameters COUNT-C, DIRECTION and BEARER used in the ciphering unit are not applicable any more.

COUNT-C is a time dependent input, which consist of the MAC-d HFN (Hyper Frame Number, a parameter) value and CFN (Connection Frame Number, a parameter used by such services, which are using transparent RLC mode) or SFN (Sequence Frame Number, a parameter used by such services, which are using either unacknowledged or acknowledged RLC mode), which both are dependent of the current state of the data transmission and the transmission instance on the air interface. It is noted that HFN is a Hyper Frame Number, which is a parameter, CFN is a Connection Frame Number and SFN is a Sequence Frame Number, which are also a parameters. For point-to-point connections these kinds of values are possible to define, because UE and NW (Network) are synchronised at the beginning of the connection (i.e. both ends know from which value the counting of HFN and CFN/SFN should be started). In case of multicast, such synchronisation is problematic to arrange and therefore no time dependent input parameters can be used for multicast ciphering. Therefore, this not used in the first embodiment. Nevertheless, in the second embodiment a way will be presented in which a counter value may be applied.

DIRECTION identifies the direction to where corresponding data is sent. In a case of multicast the use value is always the same, because the only applicable direction is downlink.

BEARER: Each point-to-point connection is labelled with the bearer identification, which is like a banner to a group of parameters, which are assigned only for the connection, in question. Bearer identification along with the corresponding parameters for the connection is sent to the UE in RRC: RADIO BEARER SETUP message. For multicast services the support of such prescient L3 signalling exchange is impossible to provide and therefore no currently defined bearer concept can be extended to cover also the multicast services. As an alternative, it may be a valid approach to define specific new bearer types to be used for multicast and broadcast services. If such new bearers are introduced it is foreseen that ciphering algorithm also should use the corresponding new bearer identification.

After removing the parameters described above the remaining parameters do not guarantee security for the encrypted data, therefore new more suitable parameters for multicast need to be introduced. That is, the input parameters as COUNT-C (or at least HFN part), DIRECTION and BEARER (shown in FIG. 2) can be replaced with parameters such as GROUP ID, SERVICE ID, SUBSERVICE ID, PACKET ID (or FRAME ID) (FIG. 3) described in the following. These parameters can be divided into four categories: subscriber related, service related, RAN related values and cell related values.

Subscriber Related Values

GROUP ID: The purpose of the GROUP ID is to represent such value, which identifies the multicast group, which is allowed to use of this service and which is allowed to listen this multicast session. In the example of FIG. 1, UE's A, B, K and L may belong to such a multicast group.

SUBSCRIBER ID: the purpose of the SUBSCRIBER ID is identifying the subscriber. That is, in the example of FIG. 1, each of the UE's has its own SUBSCRIBER ID.

Service Related Values

SERVICE ID: the purpose of the SERVICE ID is to identify the multicast service type.

SUBSERVICE ID: The purpose of SUBSERVICE ID is to identify the particular service.

PACKET ID (or frame id): The purpose of the PACKET ID is to identify the currently received data frame or layer to SDU received from the air interface.

RAN Related Values

As an alternative it may be necessary, or it may be a benefit, to have an additional separate identity for the multicast session in RAN, namely the RANCAST ID. It is noted that the UE includes the RANCAST ID in a new type of PDP context activation message to be used for (IP) multicast registration. RNC (Radio Network Controller) shall be able to deduce the RANCAST ID from this PDP activation message. RNC can then keep track of how many mobiles have registered with a specific multicast session in every cell. RNC need not know the identity of the mobiles. Also the CN (GGSN) knows the RANCAST ID. The multicast ciphering algorithm shall be able to include RANCAST ID as an input parameter.

Cell Related Values

As an alternative the cell related values could be use to separate the used ciphering mask between e.g. the neighbour cells, when it is need to support e.g. such multicast services, which allowed data receiving only in restricted area. That is, in the example of FIG. 1, only the UE's A to G may listen to a message which is only intended for the area of cell C1.

Figure 3:
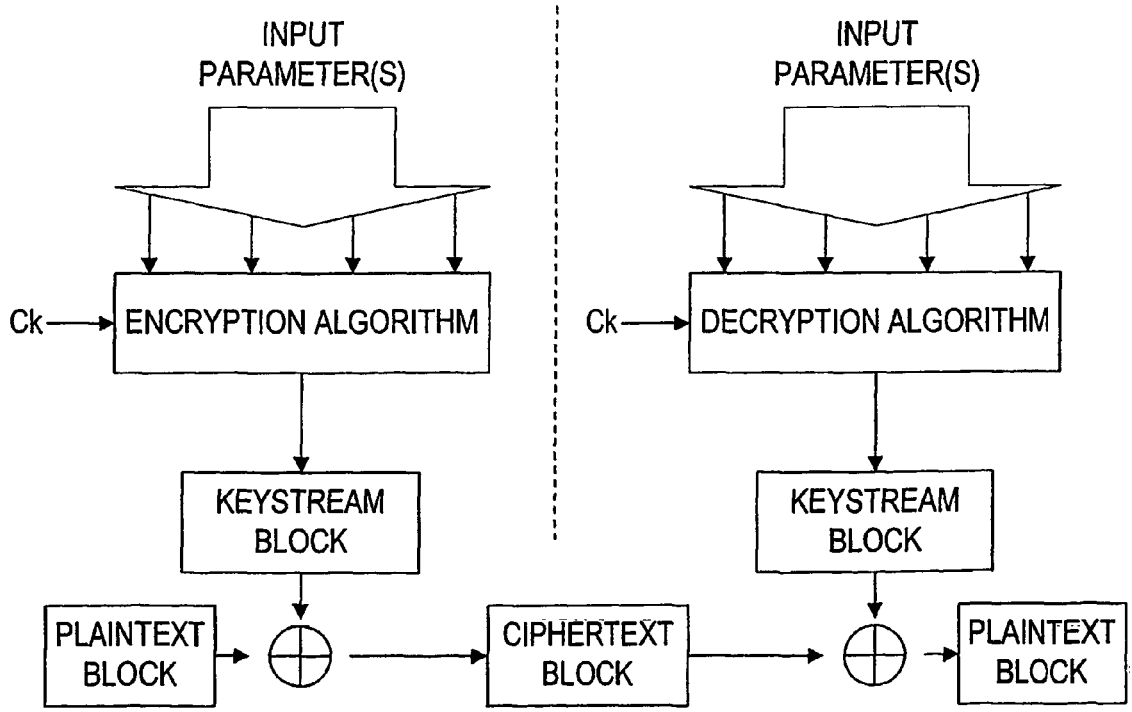
FIG. 3 shows a model to cipher data according to the first embodiment, wherein the cipher data is transmitted by using point-to-multipoint connection.

Thus, by using one or more of the above parameters as the input parameter(s) shown in FIG. 3, the group of subscribers (i.e., UE) can be restricted. Namely, only those subscribers having these parameters are able to decrypt the received message.

For example, a UE of a particular subscriber knows its GROUP ID and the SUBSERVICE ID of the service to which the subscriber is subscribed. Hence, when the UE receives a multicast message, it is able to decrypt the message. When a subscriber is not subscribed to a particular service, it may receive an encrypted multicast message, but is not able to decrypt it since the UE does not know the corresponding SUBSERVICE ID of this particular service. In case such a UE receives the message via SCCPCH, FACH or another suitable physical transport channel, it simply ignores the received message.

It is noted that not all input parameters have to be used. For example, in case the operator of the multicast service wishes to send a message to all users (e.g., for giving general information) of his service, a message may be encrypted by using no input parameter at all. In this case, all subscribers having the ciphering key are able to decrypt this message.

The input parameters described above can be used in different ways when the multicast content is ciphered.

GROUP ID and SUBSCRIBER ID can be different identifications, if there is need to identify subscribers on UE level (i.e. if there is no need for this, then these parameters can be combined). The GROUP ID is the one, which can be given to the subscriber when the subscriber makes the registration to the service. A typical GROUP ID is the "GROUP ADDRESS" used in IP-Multicasting (IGMP (Internet Group Multicasting Protocol) Message). Whereas the SUBSCRIBER ID can be e.g. the value of IMSI (in asymmetric encryption), or it can be a new specific value, which is given to the subscriber when registering to the service. The idea of using two subscriber related values is to allow operators to remove from the service e.g. such subscribers, which haven't paid they fees on time, without updating the GROUP ID to all other authorised subscribers in the very same multicast GROUP.

The SERVICE ID and SUBSERVICE ID can also either be separate values or they can be combined as a one service related parameter. The SERVICE ID is an identification which identifies the service type, e.g. news service, music service, sport clips etc., whereas the SUBSERVICE ID identifies the sent service more in detail e.g. domestic news, sport news, international news etc. The SERVICE ID could be given to the subscriber when the subscriber makes the registration, whereas SUBSERVICE ID is an identification which is transmitted to the UE along with the multicast data. The intention of this scheme is to allow the operator to separate between different services belonging to the same service type.

In the following management of the ciphering keys is described.

The validity of the ciphering key can be either:
the life time of the service or
a specific time, which is defined by the operator (e.g. hour, day, week, month etc.)

When the validity of the used ciphering key expires, still authorised subscriber is allowed to get a new ciphering key from the service provider or operator, etc. The allocation of the ciphering key can be made by the manager of the security when the UE is already in RRC connected state for some other reason, or when the UE is in idle mode.

A time limited ciphering key can be taken care of by including an expiring time in a subscriber register (e.g. HLR/RRC), which indicates when the UE needs a new ciphering key. Therefore, each time when UE/NW activates e.g. any PDP context/RRC Connection to the UE in question, the ciphering key indication shall be checked from the register and a new ciphering related information should be sent e.g. by using CN level signalling, SMS, RRC level signalling in UTRAN or peer to peer signalling between protocol layers, which are taken care of the multicast services) if indication defines that the old one has expired.

The second type of time limited ciphering key can be handled by establishing a signalling connection between UE and NW, in order to send either config SMS, or CN/UTRAN level signalling message to the UE. Based on received information the UE can update the old ciphering key to a new one.

Another alternative is to leave the initialisation of the ciphering key exchange to the UE, which internally should know when the ciphering key is expired. After expiring the ciphering key the UE can either start the ciphering key exchange procedures immediately, or it can wait until the subscriber activates another application in order to initialise RRC connection, or the subscriber has been called by third part (i.e. MTC (Mobile Terminated Call)).

In the following, storing of the security related information is described.

The storing of the security related information should comply with the following requirements:
The security related information needs to be stored in such a way that it is impossible for the subscriber or any other unauthorised user to get access to the information, both in the NW and in UE.
The information needs to be secured also against all copying transactions, which are not made by authorised service company (e.g. the manufacturer of the SIM (subscriber Identity Module, i.e., a storage device)).

At the network side the security related information could be stored either in: CN (e.g. in HLR (Home Location Register), devices of the service provider or in UTRAN (e.g. in RNC (Radio Network Controller)).

At UE side the information can be stored in SIM (Subscriber Identity Module) or in an UE memory area.

The user should not have any access either to the SIM or UE memory areas used to store the multicast deciphering keys.

When using SIM for storing the security information, it is advantageous to increase the SIM card storage capacity in order to store all necessary decryption keys and parameters, since currently this storage capacity is e.g. 8 kB or 16 kB.

Next, the encryption/decryption according to the first embodiment is described. The multicast encryption in a mobile network can be done in the following way:
The starting of the decryption can be made in at least three ways:
The receiving of data from multicast related physical channel triggers the start of the decryption. In this case the service identifications needs to be such that UE is configured to accept data belonging to this service (i.e. in service subscription/registration).
The start of the decryption is triggered by network, by sending pre-information about forthcoming multicast services.
The start of the decryption is triggered by the subscriber, upon time when the subscriber makes the "activation" of the multicast service. This trigger can be e.g. a pin code, or a password etc. Without correct trigger from subscriber the decryption of the service will not be started and subscriber will not have an access to the service. (It is noted that the use of this kind of trigger does not mean that the value of, e.g., the pin code would be used for decryption as well. It is used as a key to the service.)

The subscriber orders the service xx by sending a registration (subscribing) command to the network. The network approves the registration (subscription), e.g. by sending an SMS to the subscriber. At the same time the network also sends the parameters, which are needed to generate the correct decryption key to the mobile so that it is able to decrypt the subscribed multicast messages.

As an alternative, it may be necessary to standardise the interaction between the UE and the service provider to enable also other mechanisms than SMS, e.g. WAP.

The encryption and decryption functions are made more efficient by using symmetric cryptography. Symmetric cryptography means that the message is encrypted and decrypted by the same key.

The decryption key sent from the network to the subscriber's SIM shall not be shown to the subscriber. The decryption key (i.e., the ciphering key for decryption) is generated from a basic value (e.g., an individual service identification (which may be individual for each service) and further key generation related information, i.e., parameters, or may be generated only from the key generation parameters. The basic value (if used) may be written in the SIM or the memory of the UE during subscribing to the multicast service and, advantageously, is not sent via the radio interface. The further key related information or parameter may be a random number generated by the network. This random number may be generated based on some or all of the input parameters described above.

The transmission of the parameters is described in more detail in the following.

According to the prior art, authentication parameters are included in an Authentication and Ciphering Request message, and the MS verifies the parameters. For multicast services this kind of procedure can not be introduced, because no authentication is provided between CN and UEs.

Thus, according to the first embodiment, some of the parameters are transmitted upon registration phase. This can be done either in clear form (i.e. all parameters are readable) or a similar system as presented above can be used (i.e. from the parameters, a random number can be generated, which is sent to the UE e.g. inside the above mentioned config SMS). The some of the required parameters could be received from the system broadcast messages (SIB). This kind of information could consist of cell related information.

The rest of the information could be sent along with the multicast data, e.g. the above described PACKET ID.

Of course it is possible that all parameters, which are transmitted upon registration phase are not necessarily used for Ck generation. However in that case they are used as a input parameters to provide ciphering/deciphering.

That is, the parameters used as input parameters for the ciphering algorithm may also be used for generating the ciphering key Ck, and the parameters used for generating the ciphering key Ck may be used for ciphering and deciphering.

Multicast messages can now only be opened by SIMs, which have the correct decryption key.

The encryption (and decryption) key shall be changed in a defined time frame. The time frame can be defined by operator. The new key generation related information is sent to SIM using a multicast message, which is encrypted with the previous encryption key or by using some of the other data transmission mechanisms, as described above in the chapter on management of the ciphering keys. That is, the key generation related information may be sent when the user entity registers with a multicast service, or when a multicast transmission is activated.

Alternatively, there may be a plurality of key generation related information parts (e.g., two different random numbers), a first part of which may be sent during registration with the service, and a second part may be sent on activation of the multicast service.

The encryption algorithm can be chosen freely, but it must be efficient enough to allow the normally used encryption function f8 to be used with the ciphering key length 128 bits.

The embodiment described above can be implemented in two different ways from the cryptograhic point of view.

Firstly, a symmetric ciphering can be applied. That is, the same key is used for the encryption function and for the decryption function. Thus, only one key is needed, which simplifies the procedure.

Secondly, an asymmetric ciphering can be applied. That is, encryption is done by a recipients public key and can be decrypted only by a recipient's secret key. The asymmetric function is more secure, but on the other hand slower than symmetric ciphering.

Thus, in case of a multicast service offering general information for which a high level of security is not required, the best mode of implementation is to use the symmetric ciphering.

Summarising, the invention suggests some modifications to ciphering key allocation, input parameters for ciphering algorithms and management of the ciphering keys to overcome the problems how to restrict the reception of point-to-multipoint data to a specific group of subscribers because the current ciphering is designed for point-to-point connections.

Ciphering key allocation: The information, which can be used to define the correct multicast ciphering key, can be allocated to the subscriber when the subscriber registers with the multicast service or it can be given to the UE each time before the multicast data transmission is activated or as the peer to peer signalling connections between layers to support multicast data transmission on UTRAN and UE side.

Modified input parameters for the ciphering unit: Such input parameters as COUNT-C, DIRECTION and BEARER (see FIG. 2) can be replaced with parameters such as GROUP ID, SUBSCRIBER ID, SERVICE ID, SUBSERVICE ID, PACKET ID and CELL+RAN related information (see FIG. 3).

Management of the ciphering keys: The validity of the ciphering key can be either the life time of the service or a specific time, which is defined by the operator.

Next, a second embodiment is described. As mentioned in connection with the description of the first embodiment, in particular the use of a counter value (COUNT_C) as an input parameter is problematic in multicast (PTM) services. However, according to the second embodiment a procedure is used by which nevertheless the counter value can be used. In this way, existing UMTS security mechanisms can be used to protect also multicast traffic. Thus, the features according to the second embodiment fit especially well for $3^{rd}$ Generation UMTS networks since the presented model utilizes the security features already available in the system.

In detail, in the description of the second embodiment, means are presented to utilize UMTS confidentiality protection mechanism in mobile PTM environment. UMTS confidentiality protection is originally designed for point to point (PTP) communication environment and it cannot be directly used for this purpose as such. According to the second embodiment, however, it is described how UMTS confidentiality protection can be adapted to PTM communication environments. In this context a PTM service is understood as a unidirectional data delivery from the network to a group of mobile terminals. Because the resources in the radio link are limited, the goal is to minimize uplink signalling during PTM data reception. This means that e.g. when beginning PTM data reception, no signalling between MS and network is allowed.

The UMTS confidentiality protection is based on a shared secret key (K) that is stored at the end user's USIM in the user entity, i.e., mobile station (MS), and in Authentication Center in the network. USIM itself is physically a part of UICC (Universal Integrity Circuit Card), i.e. it resides in a smart card. The end user has no access to K (on USIM). The network delivers a nonce value RAND in plain text over the radio link to the MS. From these two values (K and RAND) both the MS and the network compute a confidentiality key (CK) which is then used for symmetric encryption between MS and radio access network. For encryption, an encryption algorithm is used. An example for such an encryption algorithm is the f8 encryption algorithm, which is usually applied in UMTS. The encryption algorithm produces a key stream, which is XORed with the plain text to be delivered to the other communicating party. The f8 encryption algorithm takes four input parameters: CK, counter value, bearer identifier and direction value.

This model cannot be directly applied to PTM communication because there is no shared secret key among all the potential receivers and because the f8 key stream generation algorithm uses such input parameters that are subscriber dependent. Thus, to make f8 to work also for PTM connections, a shared key (Ks) should be delivered to all such potential receivers that will participate a certain PTM session. This could be done over a secured PTP connection between each user willing to participate in the upcoming PTM session before the actual session. The willingness to participate in an upcoming PTM session may be done e.g. by some kind of subscription procedure, which is not further discussed here. It is assumed that such a secure Ks delivery mechanism exists and Ks is stored in the MS in such a way that the user cannot have direct access to it (stored e.g. on USIM or in a terminal memory that is not accessible for the user). This way the user may not forward Ks to illegitimate parties. Ks could be valid for some predefined time period, e.g. a day or a week.

Ks is not directly used as an input parameter for f8, but it is used as a parameter for generating the actual PTM encryption/decryption key Kptm. As another input parameter for the Kptm generation algorithm a random nonce value RAND' is used. RAND' can be delivered over an unprotected PTM channel to the receivers. This way a new session key can be easily established by transmitting a new RAND' value to the receivers which can be used for new Kptm generation. The most important requirement for the derivation algorithm is that it should be one-way: even if an attacker would know both RAND' and Kptm he would have no chance in finding out Ks. Namely, the algorithm that is used to calculate Kptm (from RAND' and Ks) is public. Thus, anybody who knows RAND' and Ks can figure out Kptm. The strength of the crypto system is based on the secrecy of Ks—it is known only by the authorized users. If an attacker knows RAND' and Kptm, he can decrypt the content as long as the Kptm is valid (i.e. as long as RAND' stays the same). But wren a new RAND' value is taken into use, the attacker has no way of calculating the new Kptm because he does nc know Ks (he cannot derive it from Kptm and RAND').

The new Kptm can be taken into use at a certain time—this time value could be delivered in conjunction with RAND' value. To enable mobile users to join the session at any time, the RAND' must be sent via the unprotected PTM channel periodically with quite a small interval, e.g. every 5 seconds.

The algorithm that derives Kptm from Ks and RAND' of course, has to be the same for both the terminal side and the network side. If the derivation algorithm is in USIM on the terminal and it is done always in the home network on the network side then the algorithm does not have to be standardized but instead it could be operator-specific. However, it is anticipated that it could be possible to offer these multicast services also for roaming users, hence the derivation algorithm could also be located in a visited network.

In the other problem, related to f8 input parameters, some modifications to these parameters has to be made to enable its usage in PTM encryption/decryption. The session key Kptm computed from Ks and RAND' can be used as a CK parameter. The direction value (DIRECTION, as defined in the first embodiment) tells whether the delivered data is uplink (i.e. from MS to RAN) or downlink (i.e. from RAN to MS). This parameter can be used as such i.e. it is set to value downlink, because PTM data is originated from the network. The bearer id value (or a substitute for it which is also a possibility since the bearer id may be replaced with some other identifier with the same length) can be delivered to MSs at the same time as Ks is delivered via a secured PTP channel. The most problematic parameter is the counter value because its value is not constant but changes during message exchange over the secured channel. In PTP the RAN and MS are synchronized at connection setup and thus they can use this counter value in a synchronized manner during the connection. In PTM the situation is different, since there is no signaling connection between MS and the network when beginning PTM data reception and therefore RAN and MSs cannot be synchronized. Also, because there are multiple receivers that join at varying times to the session, staying in synchronization is very hard to implement.

The solution to this problem is to deliver the counter value in conjunction with the encrypted content packages over the air link. At least the most significant part of the counter value that is in use in the beginning of the sending of the content packets is transmitted to all receivers. After that the receivers and the sender are synchronized. For the rest of the connection they are able to maintain the synchronization of counter values by normal synchronization means provided by 3G UTRAN. In this case, the most significant part of the counter is never more transmitted but it is implicitly maintained in sync as the least significant part is sent explicitly.

This solution does not work for receivers who join the session at some later phase. To allow also this, the whole counter value (e.g., COUNT_C as defined in the first embodiment) should be sent with regular time intervals. Thus, at this time intervals also the receiver who joins later has all the required parameters and can apply f8 decryption to the received PTM content.

Figure 4:
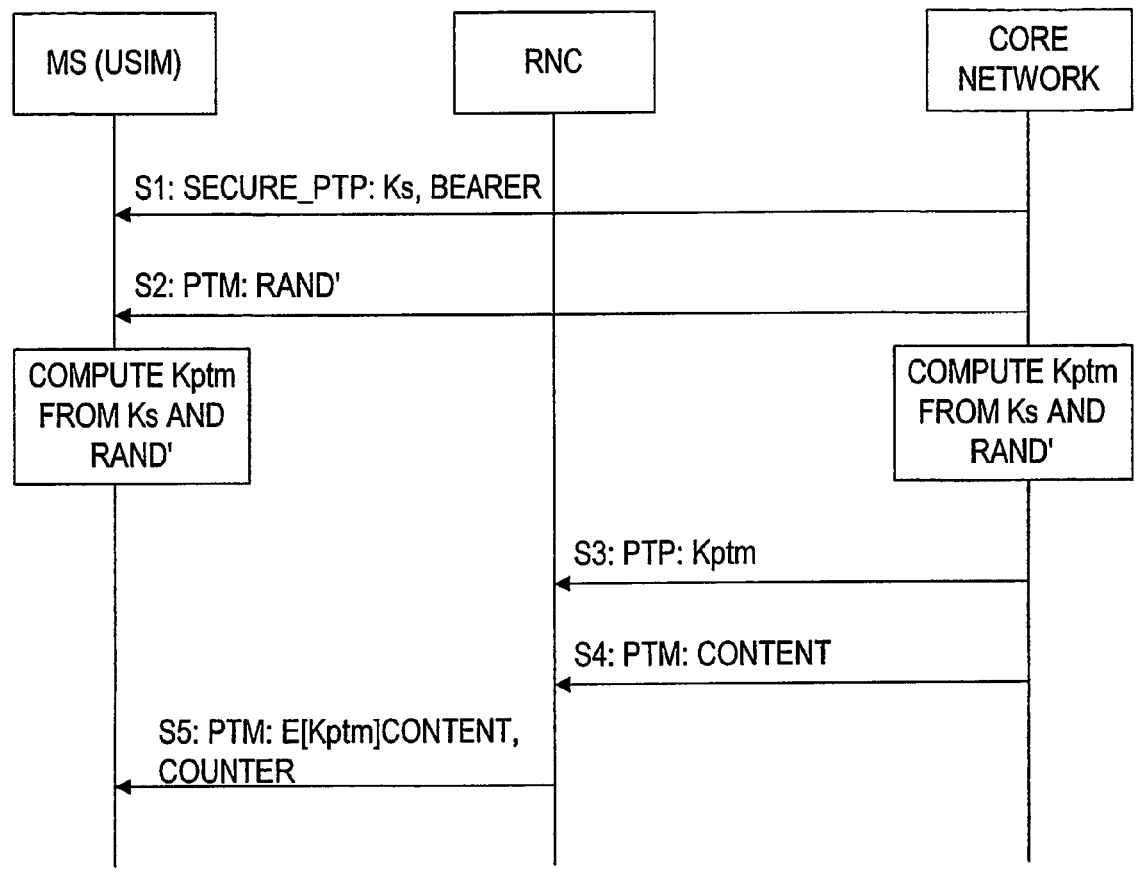
FIG. 4 shows a signalling diagram according to the second embodiment.

The solution according to the second embodiment is described by referring to FIG. 4. In the figure 'E[Kptm] ( . . . )' means that the data within the braces is encrypted with the key Kptm. The used delivery channel type is also given with each signal in the diagram. In detail, PTP indicates a point to point connection, whereas PTM indicates a point to multipoint connection.

The first signal S1 presents the procedure in which the shared secret key Ks and bearer identifier (e.g., parameter BEARER as defined in the first embodiment) of the PTM session are delivered over a secured PTP (point-to-point) connection to a session's group member. Instead of the bearer identifier (BEARER), also another similar identifier of the same length could be used.

In the second signal S2, the RAND' value used for session key generation is delivered in plain text over a PTM channel, which every receiver may listen to.

From these parameters (Ks and RAND') a subscribed user may compute the session key Kptm. These values are also stored at the network side (in some register, e.g. in AuC) and the same calculations can be carried out. Kptm is passed from the core network to RAN (actually RNC, signal S3).

Content originating from the core network comes in plain text (signal S4) to the RAN which encrypts it with Kptm. This encrypted signal with the indication of used counter value is delivered over PTM connection to the receivers (signal S5). Thus only subscribed receivers may decrypt the content since only they have the required session key Kptm.

With certain time periods the Kptm may be changed by delivering a new RAND' value to the receivers and a time value which indicates the time in which the value comes into effect. Just like described above, the terminals and the network compute a new Kptm and start using it at the given time. This operation can be called as re-keying. It might be required to deliver two different RAND' values for the same time, because a subscriber might begin content reception right in the middle of the re-keying phase when the previous key is still in use but the new RAND' value is already being delivered. Thus the new receiver may compute both the Kptm that is currently in use (and begin data reception immediately) and the new Kptm (to be prepared to receive the content in the near future).

With the approach described here multiple benefits can be gained:
  Using existing UMTS encryption algorithms the changes to the network elements can be kept in minimum.
  Uplink signaling is not required to take a new key in use during a session.
  Parameters for Kptm can be delivered using a shared unencrypted channel. Thus there is no need for PTP signaling connections for this purpose.

In the following, some alternatives to the second embodiment are described.

As a first alternative, the RAND' values used for establishing a new session key could be also delivered in conjunction with Ks and bearer id delivery over an encrypted PTP connection. In this approach there should be a list of RAND's and the validity times for these values. This way the MS could compute Kptm and the use of unencrypted PTM channel for RAND' delivery would be unnecessary. In this way, the security can be improved since also the RAND' values are delivered over a secure connection. This, however, requires that a lot of RAND' and timing data have to be stored such that large memory resources of an MS have to be occupied.

As a second alternative, the delivery of RAND' could be also done using encrypted PTP connections to each session member. The benefit of this re-keying method is that the member could also inform the network whether it wants to quit or continue its membership. Therefore a more fine-grained membership duration information would be generated and could be used e.g. for charging purposes. However, there would be a lot of signaling between the network and MS.

Thus, the preferred way to implement RAND' delivery is as described above, namely by using unencrypted PTM channel. This way the memory requirements of the encryption are kept in minimum.

As described above, the delivery of the counter value with the encrypted content is preferred procedure according to the second embodiment. In practice, the suggested method of delivering this value unencrypted is the only possibility. Namely, if the counter value would also be encrypted, the MS would have no means to figure out the counter value since the decryption depends on it. If the counter value of the next packet would be included in encrypted form to a packet, there would also be problems. An MS joining a session would need the initial value of the counter to be able to decrypt the first packet it receives. To get this initial value, some new mechanism should be introduced to prevent unnecessary signalling. On the other hand, basically the counter value is not secret information in the current UTRAN security architecture. The START parameter indicates the COUNT value in the beginning of an RRC connection; later COUNT values are changing but an eavesdropper can also maintain in sync about which COUNT value is in use.

In the following, the main features according to the second embodiment are shortly summarized. The usage of the confidentiality protection model of UMTS is not directly possible as such in point to multipoint (PTM) environment e.g. because the confidentiality key generation algorithm uses subscriber dependent input parameters (secret key). A main idea according to the second embodiment is to deliver the counter value in conjunction with the content stream (in plain text via PTM channel), thus enabling the receivers to decrypt the content. The decryption key can be updated periodically by sending a new RAND' value to the receivers. With this approach, no additional point to point signalling between the network and the terminal is required and thus network resources are saved.

It is noted that the second embodiment is not limited to the use of the f8 encryption algorithm, but that instead other encryption algorithm may be used which also use at least a counter value as an input parameter, and preferably also use a random number as an input parameter.

Furthermore, according to the second embodiment the counter value (COUNT_C) is delivered unencrypted together with the encrypted data (signal S5 in FIG. 4). Alternatively, the counter value may also be transmitted via a PTM channel (similar to the transmission of the RAND' value in signal S2 of FIG. 4). In this way, the counter value may be transmitted to the user entity at regular intervals independently of the delivery of the encrypted data packets. In this case, however, there should be some kind of association between counter value and data packets. Otherwise, it would not be known which counter value should be used to decrypt a certain packet.

As a further alternative, also the RAND' value may be transmitted in the same way as the counter value, i.e., together with encrypted data packets (as in signal S4 of FIG. 4).

The description of the second embodiment is emphasised on the encryption, however, the same procedures also apply for the decryption, as described in more detail in the first embodiment.

According to the second embodiment, Kptm is computed in the core network, as illustrated in FIG. 4. However, alternatively it can also be computed in the RNC. In this way, Ks and RAND' would have to be transmitted also to RNC.

In the following, a third embodiment is described. According to the third embodiment, a so-called light authentication model is proposed. In this light authentication model, authentication parameters are used to authenticate users requesting multicast services (e.g., MBMS services, MBMS=Multicast Broadcast Multimedia Service) or also other kind of services In addition the light authentication can be also used when UE performs such a procedure, the results of which are required to transmit to the network, but the transmission of which does not normally trigger the exchange of multiple signalling messages. This kind of procedure could be e.g. RA/LA location updates (Routing Area/Location Area location updates).

For multicast services two different phases can be defined, which can be mandatory to support before the UE is applicable to receive MBMS services. These phases are
  The service subscription/registration phase, during which the UE gets the necessary configuration messages (this should be performed by using the point-to-point connection, in order to make sure that UEs are receiving the most important configuration parameters correctly.)
  The second phase is named as a joining phase, upon which the UE indicates to the network which sessions from the specific services the UE/subscriber is willing to receive. In practise this means that the number of joining messages (joining request messages and joining response messages) is dependent on the number of sessions, of which the subscriber is willing to follow.

It is noted that the first phase, i.e. the service registration/subscription phase can be split in two phases. The service registration phase is the phase during which the subscriber or user agrees with a service provider or operator to receive multicast (or restricted broadcast) services. In contrast to the registration phase, the subscription phase is the phase the phase in which the desired MBMS services are selected. That is, upon registration phase, the subscriber signs an agreement with the operator about the multicast, then upon subscription phase, the subscriber chooses the services (and upon joining phase he selects the sessions from the services). Both of these phases can be used for parameter exchange, therefore these phases are referred to as one phase in this description, namely as the service registration/subscription phase.

Because the number and the frequency to send joining messages can by quite big upon life time of the subscription and the time gap to send joining messages can be quite limited (i.e. compared to the starting time of MBMS session), the performing of the joining should be made as light as possible. In practise this would mean that joining should be possible to perform without establishing an RRC (Radio Resource Controller) connection first. That is, it should be possible to perform the joining when the subscriber's UE is in RRC IDLE mode. The IDLE mode is defined in the 3GPP specifications as the state of user equipment being switched on, but not having an established termination to the controller of a wireless system. In particular, the RRC IDLE means that UE in core network is in PMM idle state i.e. it has MM context but no resources on Iu interface (MM is Mobility Management, and PMM idle state is one of the PMM states, others being PMM-detached and PMM-connected, for example). And from radio access network point of view the UE don't have any resources and therefore the UE is only known by the CN.

Conventionally, the above described joining cannot be performed without an RRC connection. However, in document U.S. Ser. No. 10/141,128 the use of a new connection type between the UE and CN has been proposed. In principle this new connection type is proposed to be similar with the connection type, which is presently defined between the UE and RNC, in order to send the RRC connection request messages to the network when no RRC connection has been established to the UE yet. That is, the second part of the ciphering information may be sent in a joining response message by using a channel which is available at least to all multicast/broadcast capable user entities. This channel can be e.g. so called common channel or enhanced common channel. (i.e. the following channels are used in uplink: PRACH (Physical Random Access channel), RACH (Random Access Channel) and CCCH (Common Control Channel). The corresponding channels in downlink are: SCCPCH (Secondary Common Control Physical Channel), FACH (Fast Access Channel) and CCCH (Common Control Channel. The first channel on the list always indicates the used physical channel, the second the used transport channel and the last one the used logical channel type). By using the proposal according to the above document, the problem of establishing the RRC connection is overcome, but the problem of authenticating the sender at the receiver side is still open. Thus, the present third embodiment is directed to a solution for the problem.

That is, in a case of MBMS, the scheme according to the third embodiment allows the system to use a lighted joining procedure. In practise this means that all those UEs, which are e.g. in RRC IDLE mode could just send one joining request message to the network without requesting the establishment of RRC connection first. From network point of view this could introduce major saving from resource point of view (especially if joining is mandatory to perform each time before the new session), if the joining request message is allowed to be sent via such new connection type, which has already been presented in the above-mentioned document U.S. Ser. No. 10/141,128 (in this case UE does not have any RRC connections yet). Otherwise, if no authentication can be provided for the joining request messages, the only way to make sure that the joining request message is coming from the correct UE is to establish the point-to-point connection, which in a case of RRC IDLE mode UEs, means very hard signalling in order to send just one signalling message (i.e. joining).

When the case is something else than MBMS (i.e., a non-multicast related service), then this scheme allows the UE to send e.g. Routing Area/Location Area update messages, also by using the proposed new connection type, without establishing the RRC connection first.

In the following, the lighted authentication model according to the third embodiment is described in more detail. This model can be used upon such cases when the UE sends to the network such messages, which content cannot be accepted before the sender of the message is not only authenticated but also authorized. This kind of message could be e.g. the MBMS joining request message, which is sent by the UE to indicate its willingness of receiving a certain MBMS session(s) from the certain MBMS service.

The lighted authentication model contains the following steps:

1. The UE is configured with the lighted authentication parameters. In a case of MBMS the configuration can be done upon the above-described service subscription/registration phase (e.g. MBMS multicast service identification and service specific authentication indication). For other cases (i.e., non-MBMS services) the information (e.g. Routing area id, Location area id, or CN id) can be sent to the UEs e.g. via SIB (System Information Block) signalling. With MBMS, also a service specific authentication indication may be based on information transmitted via SIB signalling.

2. When the UE recognizes (or the network has requested the light authentication) that it has to send such signalling message (i.e., joining request message) to the CN, in where the authentication is required, e.g. MBMS joining request message, the UE calculates an authentication RAND, which is included into the message.

MBMS:
Authentication RAND=Alg(IMSI+Service indication)
That is, for calculating the Authentication RAND value, the IMSI and a Service indication value is used as an input parameters for the algorithm.

In case of non-MBMS services, the authentication RAND may be calculated by using other parameters (e.g., CN id, routing area id, location are id etc.) instead of the service indication value:

Other:
Authentication RAND=Alg(IMSI+Parameter)
(Parameter: e.g. CN id, routing area id, location area id etc)
The service indication can change after each authentication. This service indication can be generated e.g. by a counter, or it can be generated in a pseudo-random fashion from some information transmitted via SIB signalling.

If the integrity of the rest of the message contents needs to be assured, a message-digest/checksum can be calculated from the message content with some suitable hashing algorithm. This can then be included together with IMSI to the RAND generation algorithm.

3. Depending on which type of message UE is going to transmit the message may consist of the actual message parameter, message data, and authentication parameters.

Figure 5:
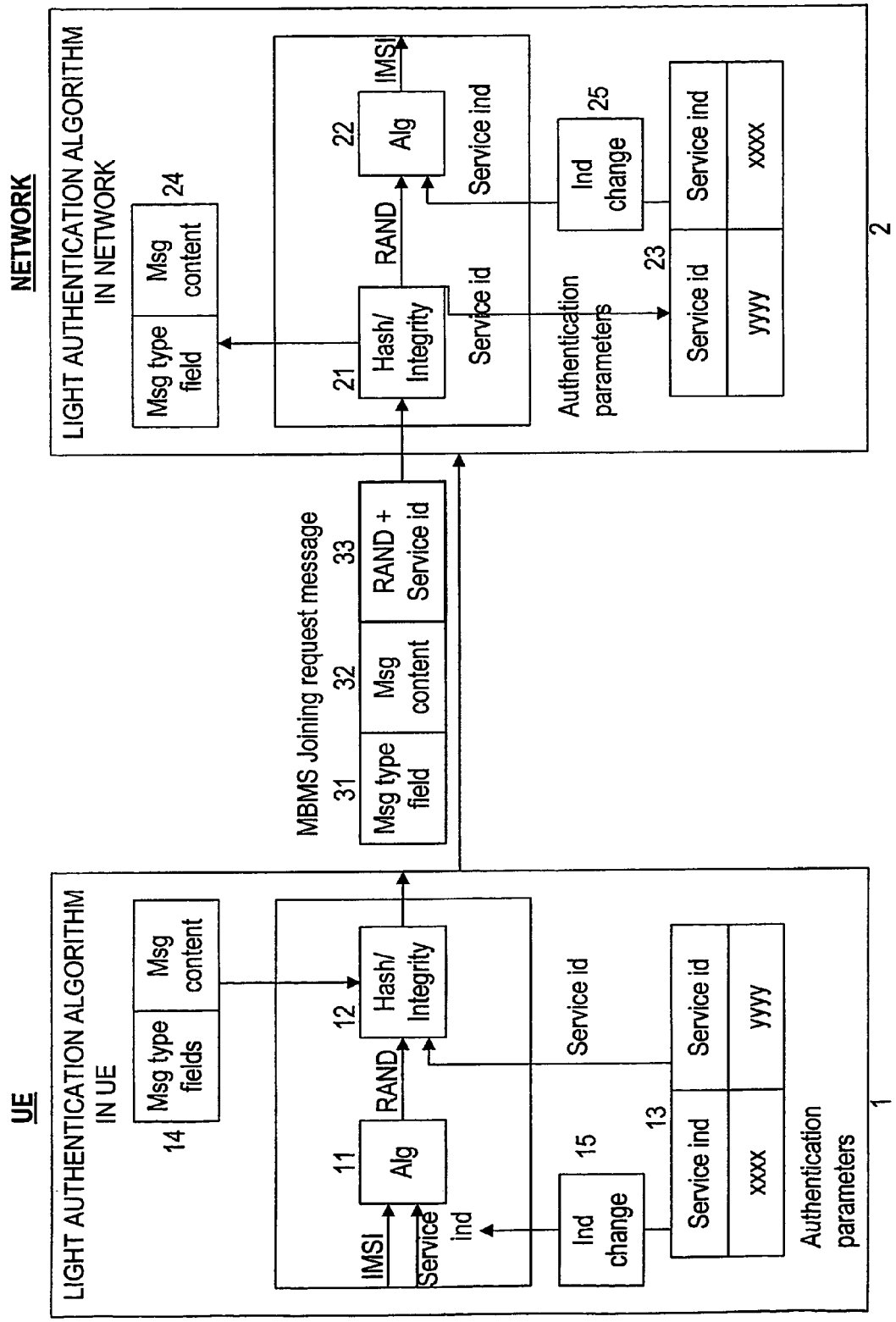
FIG. 5 illustrates an algorithm for a light authentication according to a third embodiment in case of MBMS.

In FIG. 5, an MBMS joining request message is illustrated. The field "Msg type fields" contains the actual message parameter, the field Msg content" contains the message data, and the last field (enclosed by bold rectangle) contains the authentication parameters, namely RAND+Service id (identification).

MBMS: authentication parameters RAND+service identification

For non-MBMS services, the authentication parameters may include only RAND:

Other: authentication parameters=RAND

Also further parameters may be used (as described in connection with the first embodiment, for example). In this case, the receiver must be aware of the other used parameters at the UE side.

4. After reception of the message at the network side (e.g. at SGSN), the network performs the reversed calculation from which the result should be IMSI and, if integrity protection is used also the message digest/checksum. In case of MBMS, the network may also check the RAND against those RANDs previously used for the service and reject the joining, if the same RAND have been used previously. This may be necessary to prevent playback attack. That is, in this way it can be prevented that a user joins again by using an old RAND which is no longer valid for the service.

5. After reception of the IMSI the network can check the authorization information regarding the received IMSI e.g. from HLR (Home Location Register). The integrity of the message content can optionally be checked with the message digest/checksum.

6. If response is needed, the network may send to the UE an acknowledgement/non-acknowledgement message containing a decision field and the received RAND value. In the decision field, an indication is given whether the request for joining the service is accepted or not.

In the following, the third embodiment is described in more detail by referring to FIGS. 5 and 6. Two cases are described, the first case being MBMS service, the second case other services than MBMS.

Case 1: MBMS

In case of MBMS, the required parameters can be provided to the UE upon service subscription/registration phase, which will be performed by using the point-to-point connection between the UE and the service provider.

Upon this time, the service provider can send to the UE e.g. the following parameters service identification (i.e. identifies the service from the other MBMS services)

service indication, which is used for light authentication purpose only. The service indication may also change dynamically after each authentication. That is, the value of the service indication can be changed such that after re-accessing the service, the user cannot use the old service indication but has to change the value by using predetermined rules known by both UE and the NW. If the UE is unsubscribed, also the unlicensed used of service indication of certain service is detected in NW and non-accepted. In order to have a right the make joining process once again the UE/subscriber must perform the service subscription and/or registration again (depending on whether the parameter exchange is performed in the above-described service registration phase or service subscription phase). In this case the value and the information to service indication is given once again to the UE.

Both of these values must also be known at the Network side (e.g. in SGSN)

By allocating not only the service identification but also service indication, the concept can be made more secure, because over the interface the UE may send the calculated RAND value and the service identification, which at the network will be used as a pointer to the correct service indication. The service indication may also change dynamically after each authentication. It can be generated e.g. by a counter, or by some pseudo-random algorithm using as its input some suitable information transmitted via SIB signalling.

In FIG. 5, the process for generating and sending an MBMS joining request message is illustrated. On the UE side (block 1 in FIG. 5), RAND is calculated by an algorithm block (Alg, marked with the reference character 11) which uses IMSI and the service indication (Service ind) as inputs. The service indication is determined based on the service identification. For example, the service identification block 13 can contain a mapping table in which an allocation between a service identification value and a service indication value is predetermined. In FIG. 5, this is exemplified in that a certain service identification value marked with "xxxx" which corresponds to a service indication value marked with "yyyy". In FIG. 5, it is also illustrated how the service indication value can be dynamically changed. Namely, the service indication from the service identification block 13 is supplied to a service indication change block (ind change) 15. This service indication change block may comprise a counter, which counter counts a value (e.g., based on statistic information, which will be based on the number how many times the UE has made the joining to the MBMS service in question, for example) and adds this value to the service indication value. The thus changed service indication value is then supplied to the algorithm block 11.

Alternatively, also other ways of allocating a service indication to a service identification are possible. For example, a certain rule may be used to calculate a service indication value from a service identification value. The calculation rule may be changed dynamically.

In a hash/integrity block 12, the joining request message is generated. That is, Msg type fields and the message content (Msg content) 14 are combined together with the RAND calculated by the algorithm. In addition, also the service identification (Service id) is included into the joining request message, as indicated by the arrow leading from the service identification block to the hash/integrity block. The hash/integrity block 12 serves to assure the integrity of the rest of the message contents, as mentioned above. That is, a message-digest/checksum is calculated from the message content with a suitable hashing algorithm. Hence, the MBMS joining request message comprises the following fields: MSG type fields (field 31), MSG content (field 32), RAND+Service id (field 33), as shown in the figure.

This MBMS joining request message thus generated is sent to the network. On the network side (block 2 in FIG. 5), the message is separated by a hash/integrity block 21 such that the original message (consisting of Msg type fields and message content) 24 is separated from RAND. The service identification 23 is extracted after the hash/integrity block 21 which also checks the integrity of the message by using the checksum calculated by the hash/integrity block 12 on the UE side. As on the UE side, the service indication is determined based on the service identification. For example, as illustrated by a service identification block 23, the service indication value may be determined by using a mapping between service identification value and service indication value. If in the UE the service indication value has been changed, as shown in block 15 on the UE side, the network side has to know the same rules for changing the service indication value correspondingly. This is indicated by block 25, in which the service indication may be changed similar in the way has been in block 15 on the UE side. An algorithm block (Alg) 22 calculates the IMSI of the user based on the RAND value and the service indication.

Hence, on the network side it can be checked whether the user identified by the IMSI thus calculated is entitled to actually join the requested service, i.e., whether he is correctly subscribed to this service.

An alternative to using the service indication could be the use of service identification only together with IMSI in order to calculate the correct RAND value. But in this case the security of the RAND value is totally dependent on the used algorithm for calculation, whereas in the first case an eavesdropper has to know not only the RAND but also the service indication, which is not available to a subscriber if he has not made the service subscription/registration with the service provider.

Case 2: Other than MBMS

In this case the calculation could be based on either the information about routing area id, location area id or e.g. some id, which could identify the identity of the core network or radio access network etc. The main thing in this case should be that the identification must be known also by the receiver of the message and it should be possible of transmitting to the UEs in the cell by using the System Information Blocks (SIB).

Inside the actual message the UE could add in this case only the RAND value, because the identification of the other one is already known by receiver.

Figure 6:
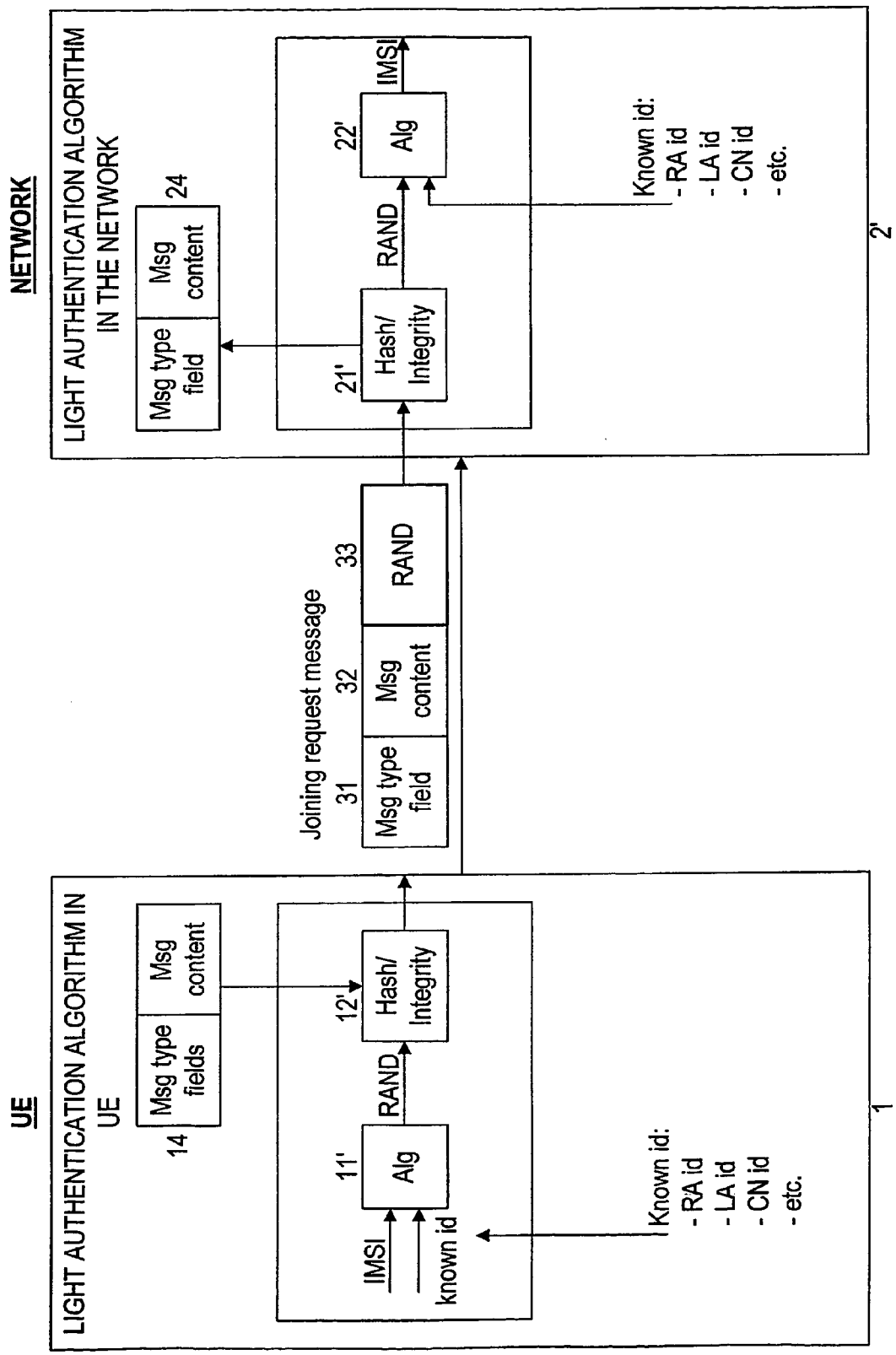
FIG. 6 illustrates an algorithm for a light authentication according to a third embodiment in case other than MBMS.

The process in this case is illustrated in FIG. 6. In the following, only the differences to FIG. 5 are described. The algorithm block 11' takes as inputs the IMSI and the known identification, as described above. The hash/integrity block 12' generates the joining request message similar as the hash/integrity block 12 of FIG. 5 with the exception that no service identification is included. Thus, field 33' of the joining request message contains only RAND.

On the network side (block 2'), the hash/integrity block 211 separates the original message 24 from RAND. The algorithm block 22' calculates the IMSI from RAND and the known identification (known id).

Thus, according to the third embodiment, for the MBMS a lighted authentication scheme is introduced in which UEs, which are e.g. in RRC IDLE (or possible cell_PCH (Paging Channel) or URA_PCH states (URA: UTRAN registration area)) mode could just send one joining request message to the network without requesting the establishment of RRC connection first i.e. no point-to-point connection is needed. From RAN network point of view this could introduce major saving in resources.

Thus, according to the third embodiment, the UE is configured with the lighted authentication parameters e.g. service identification and service indication (used for light authentication purposes only) upon service subscription/registration phase. The UE calculates the authentication RAND=IMSI+Service indication, which is included into e.g. joining request message with the service identification. In this way the service indication is not send over air interface except upon the service subscription/registration phase (i.e. point-to-point connection), when information is secured by the normal encryption procedures. After reception of the e.g. joining request message the network can read the service identification and based on that information find out the used service indication value. Now the network can perform the reverse calculation and make the authentication and authorization based on calculated IMSI.

The embodiment can be extended to also other such transactions, when the RRC idle/cell_PCH/URA_PCH mode UE sends only one message to the network e.g. Routing/location area update. The main goal is that the authentication can be made from the received message and therefore no RRC connection is required to establish for transmission of just one message.

By the light authentication model according to the third embodiment, the following advantages can be achieved: The need for establishing an RRC connection is reduced, when the RRC connection is established only to send one signalling message i.e. MBMS joining, Routing/location area update. That is, resources from the network and from the air interface are saved. Moreover, the model according to the third embodiment allows the RRC IDLE mode UEs to make multiple MBMS joinings simultaneously. Furthermore, the calculation model resembles the model which has been introduce for ciphering key delivery, but in this case instead of sending the key related information, the UE is calculating the identification related information.

In addition, it is noted that in case an already existing A3 algorithm cannot be used for this purpose a new one must be introduced. Moreover, advantageously the RAND generation algorithm should to be optimised to produce short, but still secure RANDs.

Moreover, it is noted that the calculated authentication RAND can be used for encrypting/decrypting multicast messages, but alternatively, the authentication RAND may be used for authentication only.

Next, a fourth embodiment of the invention is described. According to the fourth embodiment, ciphering information (e.g., security parameters) are separately transmitted during the service subscription/registration phase and the joining phase, which are described in the third embodiment.

As described above, the discussion about the security and the transmission of the security related parameters to the UE has initialised in 3GPP. They should be transmitted to the UE in such secured form that no other UE can receive this information and use it without any agreement with service provider. Also the requirement that after reception of the security parameters the UE should be capable of receiving the MBMS data implies that the exchange of the security parameters should happen at very late stage of the MBMS data service activation.

From UTRAN point of view, the first requirement means in practise an establishment of the point-to-point connection, whereas the second requirement assumes that this establishment is made for the joining phase, upon when the subscriber selects of which sessions of she/he is ready to join in.

In principle, the transmission of joining request messages by using the point-to-point connection is not unfeasible. However, when considering the joining more detail it is clear that joining is characterized by the following characteristics:

Joining is proposed to be performed before each session of the service (i.e. if a user wants to receive 4 news clips per day, he has to perform joining also 4 times/day), which means—depending on the number of supported MBMS services in UE—a frequent activation of the joining request messages and continuous establishment of the RRC connection or RRC state change transactions is necessary.

It is possible to perform joining by sending only one message in downlink and one message in uplink (if the authentication of the sender is provided the way that it has been described in third embodiment)

The gap between the initialisation of the joining procedure and the start of the MBMS data transmission can be quite short.

All listed characteristics favour the idea that no point-to-point connection is established for the joining messages (joining request messages and/or joining response messages) and, therefore, the joining messages cannot be used to support all security parameters.

On the other hand, the transmissions of all security parameters can not be supported upon service subscription/registration phase either, because otherwise, the UE could listen to the service without performing any joining procedure.

Hence, according to the fourth embodiment, a division of the transmission of the ciphering information (security parameters) into two phases is performed as solution in both of these problems. Thus, the fourth embodiment is directed to an operation how transmission of the ciphering information (encryption and/or authentication information) can be divided between service subscription/registration phase and joining phases.

In the fourth embodiment, it is described how a system could provide the MBMS ciphering information (or security information like, e.g., security parameters) to the UEs by fulfilling the following requirements:

MBMS multicast mode service should be available only to such UEs, which have performed not only the service subscription/registration phase but also MBMS joining phase.

MBMS encryption should be provided to the UE the way that a possible eavesdropping is complicate or if some information is still managed to receive by unauthorized UEs, this information is not useful to it.

In order to fulfil the above-mentioned requirements, according to the fourth embodiment the transmission of the security parameters is divided between two different phases.

The first phase is the service subscription/registration phase, which is described above in the third embodiment in more detail. Because upon this phase the subscriber makes the registration/subscription with the service provider/operator about the specific services, the service provider/operator is obligated to send to the UE such configuration parameters, like application based parameters and the first part and also the most of the bits of the security parameters, based on which the UE is capable of configure itself to receive the MBMS announcement messages and the non-ciphered MBMS services (i.e., MBMS services which are available to all subscriber without the necessity to perform joining to a particular service). The subscription/registration phase is performed by using the point-to-point connection in order to be sure that all necessary information is received secured and in correct form by UE.

The second phase is the joining phase which is also described in the third embodiment. This phase is necessary for MBMS services which are ciphered. In this phase, the second part of the security parameter bits is sent to UE. That is, in principle no point-to-point connection is needed. In this case, after the UE has sent the MBMS joining request message to the network and after the network has identified the sender and checked that UE is authorized to made the joining procedure to the session in question, the network sends the rest of the encryption information to the UE inside the response message.

The ciphering information (or encryption information), which is sent upon this phase, is not useful to any other UE, which may catch this information from the response message, because the most important part of the ciphering information has already sent upon service subscription/registration phase and therefore they should not be available in such UEs, which have not performed the service subscription/registration phase for the same service.

Also eavesdropping by such UEs, which already have made the subscription/registration, can be prevented by not including the service information into the response message. In that way the eavesdropping UEs do not know for which service the received parameters are meant to. Or another way to prevent UEs to use information inside the response message is by integrity protecting the bits by using e.g. the IMSI as a one key integrity parameter (another input parameter for integrity could be the RAND value which has been sent inside the MBMS joining request message. The idea of RAND has been introduced in the third embodiment described above).

The ciphering information (e.g., security bits) which can be included into a MBMS joining response message can consist of Least significant N bits from the key related parameter (e.g. from RAND, which is transmitted over the air interface as an input for Kc calculation, or from other parameter, which is used for ciphering purpose). In this case, the remaining M most significant bits have been sent during the service subscription/registration phase (assuming that M+N is the total number of bits of the key related parameter).

Most significant N bits from the key related parameter. In this case, the remaining M least significant bits have been sent during the service subscription/registration phase.

An indication how previously sent RAND for Kc calculation can be used (from left to right, from right to left etc.), etc.

Additionally, some of the parameters described in connection with the first embodiment could be sent upon this time. Preferably, these additional parameters may be used for calculating the ciphering key.

Figure 7:
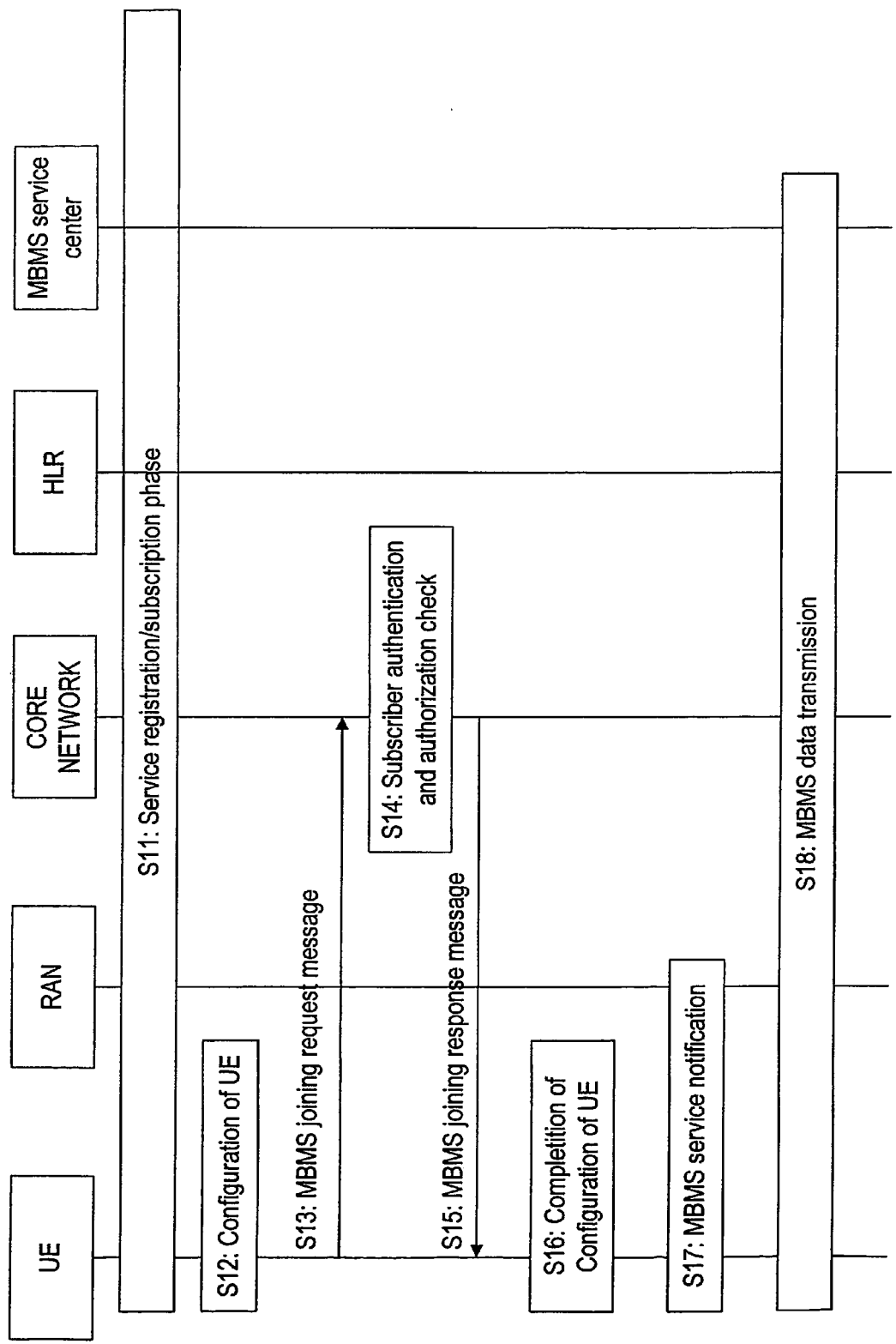
FIG. 7 shows a signalling diagram according to a fourth embodiment, in which security information is transmitted in two phases.

Thus, the second part of the security parameter bits is sent to UE upon joining phase i.e. in principle no point-to-point connection is needed. In this case after the UE has sent the MBMS joining request message to the network and after the network has identified the sender and checked that UE is authorized to made the joining procedure to the session in question the network sends the rest of the encryption information to the UE inside the response message. This operation according to the fourth embodiment is described in the following in more detail by referring to the flow diagram shown in FIG. 7.

In step S11, the service subscription/registration phase is performed. In particular, the subscriber subscribes to the specific MBMS services, and the service provider sends the necessary configuration parameter and a part of the ciphering information (ciphering key related parameters), as mentioned above.

In step S12, the UE of the subscriber configures itself based on the received parameters. However, since only a part of the ciphering information have been sent, the UE cannot complete the configuration. After this, the subscriber defines which session he/she wants to receive from the subscribed service. That is, the subscriber decides which service he/she wants to join. After that, the UE generates a corresponding MBMS joining request message which is sent to the core network (CN) in step S13. The core network, in turn, performs a subscriber and authentication check in step S14. After successful authentication and authorization, the core network generates a MBMS joining response message, in which the rest of the security information is included.

In step S15, the MBMS joining response message is sent to the UE. After reception of the MBMS joining response message, the UE can finish the configuration. That is, now all necessary ciphering information (i.e., security parameter, encryption parameter) have been received, such that the encryption configuration can be completed.

Thereafter, in step S17, a MBMS service notification is performed, which is followed by the actual MBMS data transmission in step S18. Since the UE has all necessary ciphering information, the UE can now decrypt the ciphered information which are delivered from the MBMS service center during the transmission.

The ciphering information, which is sent during the joining phase (i.e., sent in step S15), is not useful to any other UE, which may catch this information from the response message, because the most important part of the ciphering information is already sent upon service subscription/registration phase and therefore the ciphering information is not be available in such UEs, which have not performed the service subscription/ registration phase for the same service.

Also the eavesdropping by such UEs, which already have made the subscription, can be prevented or make it more difficult by not including the service information into the response message. In that way the eavesdropping UEs do not know for which service the received parameters are meant to.

A positive joining procedure takes place as described above with reference to FIG. 7. That is, the UE sends the joining request message (step S13), in where it has calculated a RAND value (used for authentication) and the service number. After checking the authorization of the UE in step S14, the network can send the joining response message in step S15, in where the previous RAND and secured parameter (security bits) for ciphering key is included. The UE can pick the right message from other messages by checking the received RAND value.

A negative joining procedure is described in the following. If the joining request message is lost, corrupted, the authorization fails or response message lost or erroneous the UE may repeat the joining procedure by calculating a new RAND value and by sending that one to the network. That is, step S13 is repeated. In this way the use of unauthorized duplicate joining request messages can be prevented. If, however, the joining attempt finally fails, the UE is not able to receive the correct MBMS joining response message such that it is not possible for the UE to take part in the requested multicast service.

Another way to prevent UEs to use information inside the response message is by integrity protecting/ciphering the bits by using e.g. the IMSI or RAND or both as a input parameter for ciphering/integrity function. The idea of RAND has been introduced in the third embodiment described above. This, however, can also be used in the fourth embodiment. Namely, in order to further enhance security, the security bits sent in the joining phase can also be ciphered.

Figure 8:
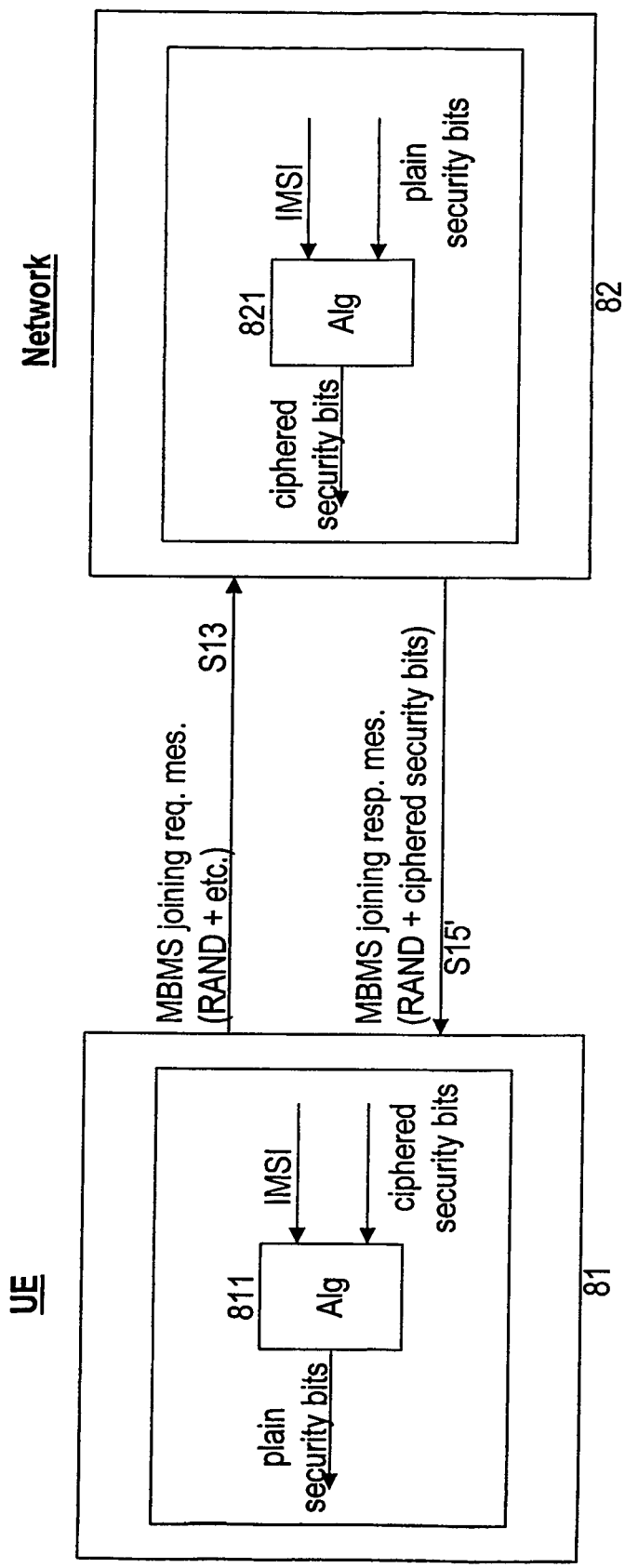
FIG. 8 shows a scheme for assuring integrity of the security bits sent in an MBMS joining response message according to the fourth embodiment.

FIG. 8 illustrates such a scheme for integrity/ciphering the bits. After receiving the MBMS joining request message from the UE (step S13, which is the same as step S13 in FIG. 7) and performing the subscriber authentication and authorization check (step S14 in FIG. 7), the network (block 82) ciphers the security bits by using an algorithm (Alg) 821. In this example, the IMSI (International Mobile Subscriber Identity) is used to cipher the security bits, from which the algorithm block 821 calculates ciphered security bits. These ciphered security bits are included in the MBMS joining response message (step S15'). In this way, only that UE which is identified by the IMSI can decipher the security bits, all other UEs having different IMSIs cannot handle the joining response message.

Thus, on the UE side (block 81), the received ciphered security bits are input in an algorithm block (Alg) 811 together with the IMSI of the UE. The algorithm block then deciphers such that the plain security bits are obtained. After this, the configuration of the UE can be completed, as described above in connection with FIG. 7 (step S16).

Thus, by the procedure according to the fourth embodiment, the problem can be overcome, which appears if all ciphering information are sent only upon service subscription/registration phase. In that case the UE does not have to perform the joining procedure in order to be able decipher the received MBMS session, which in practise means that service provider/operator does not know which UEs are listening and which are not.

The scheme according to the fourth embodiment also allows the transmission of joining messages without any point-to-point connection, which from network and radio interface point of view saves resources and decreases the additional signalling load caused by the unnecessary RRC connection establishments.

The following advantages are achieved by the fourth embodiment:
  The most important and major part of the ciphering information can be transmitted to the UE upon point-to-point connection.
  The joining can be done without establishing a point-to-point message, because the joining response message doesn't contain such information, which would be useful to any other UE.
  UEs, which have made the registration/subscription but not the joining, can not decrypt the receive MBMS data from the air interface correctly.
  The procedure for MBMS network initiated broadcast services (for these services the subscription/registration is required, but no joining is performed) no different procedure is mandatory to define, because in this case all ciphering information can be already sent upon service subscription/registration phase.

The above description and accompanying drawings only illustrate the present invention by way of example. Thus, the embodiments of the invention may vary within the scope of the attached claims.

In particular, the first, the second, the third and the fourth embodiments can freely be combined. For example, the additional parameters (e.g., subscriber related parameters and/or cell related parameters) described in the first embodiment may also be used in the second, third and fourth embodiments in order to enhance security. Furthermore, the delivery of the parameters in the second embodiment may be performed in a similar way as in the first embodiment. For example, parameter delivery on registration to a multicast service may be performed using SMS or WAP.

Moreover, in the third and fourth embodiments, the additional parameters described in the first embodiment may be sent separately during the service subscription/registration phase and the joining phase. That is, a first part of the additional parameters may be sent during the service subscription/registration phase, and a second part of the additional parameters may be sent during the joining phase.

The invention claimed is:
1. A method, comprising:
  encrypting a multicast message by using ciphering in a multicast service control device, wherein, for ciphering, a ciphering key is used;
  sending the encrypted multicast message from the multicast service control device to a plurality of user entities;
  sending, in a first message when a user entity from the plurality of user entities registers with a multicast service, a first part of a ciphering information to the user entity; and sending, in a second message, a second part of the ciphering information to the user entity, when a multicast transmission of encrypted messages is activated by the multicast service control device;

wherein the ciphering information comprises at least one parameter from which the ciphering key is derived, wherein the ciphering key is derived by at least one of the plurality of user entities based on at least the first part of the ciphering information and the second part of the ciphering information forming the at least one parameter.

2. The method according to claim 1, wherein the first message comprises a service subscription/registration response message in a point-to-point connection.

3. The method according to claim 1, wherein the second message comprises a joining response message sent subsequent to at least one of authorization and authentication of a subscriber.

4. The method according to claim 1, wherein service information is sent with the first part of the ciphering information, but the service information is not sent with the second part of the ciphering information.

5. The method according to claim 1, wherein a first part of the ciphering key derivation related parameter comprises the most significant bits or the least significant bits from the ciphering key derivation related parameter, and a second part of the ciphering key derivation related parameters comprises the remaining bits from the ciphering key derivation related parameters.

6. The method according to claim 1, wherein the at least one parameter is sent with one of the first or the second part of the ciphering information, and a remaining one of the first or the second part of the ciphering information comprises an indication how the at least one parameter is to be used for calculating the ciphering key.

7. The method according to claim 1, wherein the second part of the ciphering information is ciphered by using a value representative of a subscriber identity comprising an international mobile subscriber identification.

8. The method according to claim 1,
wherein the ciphering information is sent from the user entity to the multicast service control device, and
wherein the ciphering information is used for authenticating the user entity by the multicast service control device.

9. The method according to claim 8, wherein the ciphering information contains a service identification identifying a requested service.

10. The method according to claim 8, wherein the ciphering information contains a service indication, which is a value allocated to a service identification identifying a requested service.

11. The method according to claim 10, wherein the allocated value is changed dynamically.

12. The method according to claim 10, wherein the allocated value is determined using a map.

13. The method according to claim 10,
wherein, the ciphering key is calculated using the service indication and a user identification value,
and wherein, an authentication of the user entity is performed using the ciphering key.

14. The method according to claim 13, wherein the user identification value is an international mobile subscriber identification.

15. The method according to claim 8, wherein the ciphering information is sent to the multicast service control device in a message by using a channel not requiring a radio resource controller connection.

16. An apparatus, comprising:
a physical encrypting processor configured to encrypt a multicast message by using ciphering, wherein, for ciphering, a ciphering key is used; and
a physical transmitter configured to send the encrypted multicast message to a plurality of user entities,
wherein the transmitter is further configured to send, in a first message when a user entity from the plurality of user entities registers with a multicast service, a first part of a ciphering information to the user entity, and to send, in a second message, a second part of the ciphering information to the user entity, when a multicast transmission of encrypted messages is activated by the multicast service;
wherein the ciphering information comprises at least one parameter from which the ciphering key is derived, wherein the ciphering key is derived by at least one of the plurality of user entities based on at least the first part of the ciphering information and the second part of the ciphering information forming the at least one parameter.

17. The apparatus according to claim 16, wherein the first message comprises service subscription/registration response message in a point-to-point connection.

18. The apparatus according to claim 16, wherein the second message comprises a joining response message sent subsequent to at least one of authorization and authentication of a subscriber.

19. The apparatus according to claim 16, wherein the transmitter is further configured to send service information with the first part of the ciphering information, but to avoid sending the service information with the second part of the ciphering information.

20. The apparatus according to claim 16, wherein a first part of the ciphering key derivation related parameter comprises the most significant bits or the least significant bits from the ciphering key derivation related parameter, and a second part of the ciphering key derivation related parameters comprises the remaining bits from the ciphering key derivation related parameters.

21. The apparatus according to claim 16, wherein the physical transmitter is further configured to send the at least one parameter with one of the first or the second part of the ciphering information, and a remaining one of the first or the second part of the ciphering information comprises an indication how the at least one parameter is to be used for calculating the ciphering key.

22. The apparatus according to claim 16, wherein the physical encryption unit is further configured to cipher a second part of the ciphering information by using a value representative of a subscriber identity comprising an international mobile subscriber identification.

23. The apparatus according claim 16, further comprising:
a receiver configured to receive ciphering information from the user entity; and
an authenticator configured to authenticate the user entity by using the ciphering information.

24. The apparatus according to claim 23, wherein the ciphering information contains a service identification identifying a requested service.

25. The apparatus according to claim 24, wherein the ciphering information contains a service indication, which is a value allocated to a service identification identifying the requested service.

26. The apparatus according to claim 25, wherein the allocated value is changed dynamically.

27. The apparatus according to claim 25, wherein the allocated value is determined using a map.

28. The apparatus according to claim 25,
wherein the apparatus further comprises a calculator configured to re-calculate the service indication and a user identification value from the ciphering key, and
wherein the authenticator is further configured to authenticate the user based on the service indication and the user identification.

29. The apparatus according to claim 28, wherein the user identification value is an international mobile subscriber identification.

30. The apparatus according to claim 23, wherein the receiver is further configured to receive the ciphering information in a message by using a channel not requiring a radio resource controller connection.

31. An apparatus, comprising:
a physical receiver configured to receive an encrypted multicast message transmitted to a plurality of user entities in a network by using a multicast service; and
a physical decrypting processor configured to decrypt the encrypted multicast message by using ciphering, wherein, for ciphering, a ciphering key is used,
wherein the receiver is further configured to receive, in a first message, a first part of ciphering information when a user entity from the plurality of user entities registers with a multicast service, and to receive, in a second message, a second part of the ciphering information when a multicast transmission of encrypted multicast messages is activated by the multicast service,
wherein the ciphering information comprises at least one parameter from which the ciphering key is derived, wherein the ciphering key is derived by at least one of the plurality of user entities based on at least the first part of the ciphering information and the second part of the ciphering information forming the at least one parameter.

32. The apparatus according to claim 31, wherein the physical receiver is further configured to receive the first part of the ciphering information in a service registration response message in a point-to-point connection.

33. The apparatus according to claim 32, wherein the physical receiver is further configured to receive the second part of the ciphering information in a joining response message sent subsequent to at least one of authorization and authentication of a subscriber.

34. The apparatus according to claim 31, wherein a first part of the ciphering key derivation related parameter comprises the most significant bits or the least significant bits from the ciphering key derivation related parameter, and a second part of the ciphering key derivation related parameters comprises the remaining bits from the ciphering key derivation related parameters.

35. The apparatus according to claim 31, wherein the physical receiver is further configured to receive the at least one parameter with one of the first or the second part of the ciphering information, and a remaining one of the first or the second part of the ciphering information comprises an indication how the at least one parameter is to be used for calculating the ciphering key.

36. The apparatus according to claim 31, wherein the physical decrypting processor is further configured to cipher the second part of the ciphering information by using a value representative of the subscriber identity comprising an international mobile subscriber identification.

37. The apparatus according to claim 31, wherein the ciphering information contains a service indication, which is a value allocated to a service identification identifying a requested service.

38. The apparatus according to claim 37, wherein the allocated value is changed dynamically.

39. The apparatus according to claim 37, wherein the allocated value is determined using a map.

40. The apparatus according to claim 37,
wherein the apparatus further comprises a calculating processor configured to calculate the ciphering key based on the service indication and a user identification value, and to send the ciphering key to a multicast service control device as an authentication key.

41. The apparatus according to claim 40, wherein the user identification value is an international mobile subscriber identification.

42. The apparatus according to claim 31, further comprising a transmitter configured to send the ciphering information to the multicast service control device in a message by using a channel not requiring a radio resource controller connection.

43. A system, comprising:
a multicast service control node, wherein the multicast service control node further comprises:
a physical encrypting processor configured to encrypt a multicast message by using ciphering, wherein, for ciphering, a ciphering key is used, and
a physical transmitter configured to send the encrypted multicast message to a plurality of user entities; and
a user entity from the plurality of user entities wherein the user entity further comprises
a receiver configured to receive the encrypted multicast message transmitted to the plurality of user entities in a network by using a multicast service, and
a physical decrypting processor configured to decrypt the encrypted multicast message by using ciphering and the ciphering key,
wherein the physical transmitter is further configured to send, in a first message, a first part of ciphering information to the user entity when the user entity registers with the multicast service, and to send, in a second message, a second part of the ciphering information to the user entity when a multicast transmission of encrypted multicast messages is activated by the multicast service,
wherein the receiver is further configured to receive the first part of the ciphering information when the user entity registers with the multicast service, and to receive the second part of the ciphering information when a multicast transmission of encrypted multicast messages is activated,
wherein the ciphering information comprises at least one parameter from which the ciphering parameter is derived, wherein the ciphering key is derived by at least one of the plurality of user entities based on at least the first part of the ciphering information and the second part of the ciphering information forming the at least one parameter.

44. A method, comprising:
- receiving, at a physical receiver, an encrypted multicast message encrypted using a ciphering key and transmitted to a plurality of user entities in a network by using a multicast service;
- decrypting the encrypted multicast message by using ciphering;
- receiving, in a first message, when a user entity from the plurality of user entities registers with the multicast service, a first part of ciphering information; and
- receiving, in a second message, a second part of the ciphering information, when a multicast transmission of encrypted messages is activated by the multicast service,
- wherein the ciphering information comprises at least one parameter from which the ciphering key is derived, wherein the ciphering key is derived by at least one of the plurality of user entities based on at least the first part of the ciphering information and the second part of the ciphering information forming the at least one parameter.

45. The method according to claim 44, wherein the receiving the first part of the ciphering information further comprises receiving the first part of the ciphering information in a service registration response message in a point-to-point connection.

46. The method according to claim 45, wherein the receiving the second part of the ciphering information further comprises receiving the second part of the ciphering information in a joining response message.

47. The method according to claim 44, wherein a first part of the ciphering key derivation related parameter comprises the most significant bits or the least significant bits from the ciphering key derivation related parameter, and a second part of the ciphering key derivation related parameters comprises the remaining bits from the ciphering key derivation related parameters.

48. The method according to claim 44, further comprising receiving the at least one parameter with one of the first or the second part of the ciphering information, and a remaining one of the first or the second part of the ciphering information comprises an indication how the at least one parameter is to be used for calculating the ciphering key.

49. The method according to claim 44, wherein the decrypting the encrypted multicast message further comprises ciphering the second part of the ciphering information by using a value representative of the subscriber identity comprising an international mobile subscriber identification.

50. The method according to claim 44, wherein the ciphering information contains a service indication, which is a value allocated to a service identification identifying a requested service.

51. The method according to claim 50, wherein the allocated value is changed dynamically.

52. The method according to claim 50, wherein the allocated value is determined using a map.

53. The method according to claim 50, wherein the method further comprises:
- calculating the ciphering key based on the service indication and a user identification value; and
- sending the ciphering key to a multicast service control device as an authentication key.

54. The method according to claim 53, wherein the user identification value is an international mobile subscriber identification.

55. The method according to claim 44, further comprising sending the ciphering information to the multicast service control device in a message by using a channel not requiring a radio resource controller connection.

* * * * *